(12) United States Patent
Xu et al.

(10) Patent No.: US 10,368,031 B2
(45) Date of Patent: Jul. 30, 2019

(54) SYSTEMS AND METHODS TO CONTROL JUDDER VISIBILITY

(71) Applicant: DOLBY LABORATORIES LICENSING CORPORATION, San Francisco, CA (US)

(72) Inventors: Ning Xu, Irvine, CA (US); Kimball Darr Thurston, III, Los Angeles, CA (US); Scott Daly, Kalama, WA (US); James E. Crenshaw, Burbank, CA (US); Alfred She, Toluca Lake, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 223 days.

(21) Appl. No.: 15/119,117

(22) PCT Filed: Feb. 23, 2015

(86) PCT No.: PCT/US2015/017110
§ 371 (c)(1),
(2) Date: Aug. 15, 2016

(87) PCT Pub. No.: WO2015/130616
PCT Pub. Date: Sep. 3, 2015

(65) Prior Publication Data
US 2017/0054938 A1 Feb. 23, 2017

Related U.S. Application Data

(60) Provisional application No. 61/945,706, filed on Feb. 27, 2014, provisional application No. 62/055,555, filed on Sep. 25, 2014.

(51) Int. Cl.
*H04N 9/64* (2006.01)
*H04N 7/01* (2006.01)
(Continued)

(52) U.S. Cl.
CPC ......... *H04N 7/0127* (2013.01); *G06K 9/4661* (2013.01); *G06K 9/6202* (2013.01);
(Continued)

(58) Field of Classification Search
USPC .................................................. 348/701, 702
See application file for complete search history.

(56) References Cited

U.S. PATENT DOCUMENTS 5,929,919 A  7/1999  De Haan
6,028,608 A  2/2000  Jenkins
(Continued)

FOREIGN PATENT DOCUMENTS

CN    1913585    2/2007
CN    103167259  6/2013
(Continued)

OTHER PUBLICATIONS

Watson, A. B. et al "Window of Visibility: A Psychophysical Theory of Fidelity in Time-Sampled Visual Motion Displays" J. Opt.Soc. Am. A/vol. 3, No. 3, Mar. 1986, pp. 300-307.
(Continued)

*Primary Examiner* — Nigar Chowdhury

(57) ABSTRACT

Methods and systems for controlling judder are disclosed. Judder can be introduced locally within a picture, to restore a judder feeling which is normally expected in films. Capture time and display time of frames can be manipulated to obtain a desired amount of judder. Frames can be interpolated to obtain a film with a higher frame rate and localized control of judder.

15 Claims, 21 Drawing Sheets

(51) Int. Cl.
*H04N 5/14* (2006.01)
*H04N 5/21* (2006.01)
*G06K 9/46* (2006.01)
*G06K 9/62* (2006.01)
*G06T 5/00* (2006.01)
*H04N 5/262* (2006.01)
*G06T 7/246* (2017.01)
*H04N 21/4402* (2011.01)

(52) U.S. Cl.
CPC .............. *G06T 5/002* (2013.01); *G06T 7/248* (2017.01); *H04N 5/145* (2013.01); *H04N 5/21* (2013.01); *H04N 5/262* (2013.01); *H04N 7/014* (2013.01); *H04N 7/0112* (2013.01); *H04N 7/0132* (2013.01); *H04N 7/0135* (2013.01); *H04N 7/0115* (2013.01); *H04N 7/0147* (2013.01); *H04N 21/440281* (2013.01)

(56) References Cited

U.S. PATENT DOCUMENTS

| | | | |
|---|---|---|---|
| 6,545,740 B2 | 4/2003 | Werner | |
| 7,038,710 B2 | 5/2006 | Caviedes | |
| 8,159,605 B2 | 4/2012 | Sato | |
| 8,363,117 B2 | 1/2013 | Trumbull | |
| 8,390,704 B2 | 3/2013 | Wang | |
| 8,432,487 B2 | 4/2013 | Weston | |
| 8,446,524 B2 | 5/2013 | Chen | |
| 8,488,058 B2 | 7/2013 | Kang | |
| 8,692,935 B1* | 4/2014 | Namboodiri | H04N 7/014 348/441 |
| 8,749,703 B2* | 6/2014 | Wyman | H04N 5/145 348/441 |
| 9,438,849 B2 | 9/2016 | Liu | |
| 2006/0077292 A1* | 4/2006 | Lee | H04N 7/0115 348/448 |
| 2008/0007614 A1 | 1/2008 | Mizuhashi | |
| 2008/0232784 A1 | 9/2008 | Herpel | |
| 2009/0022411 A1 | 1/2009 | Inoue | |
| 2009/0161011 A1 | 6/2009 | Hurwitz | |
| 2009/0161017 A1 | 6/2009 | Glen | |
| 2009/0184916 A1* | 7/2009 | Miyazaki | G09G 3/3406 345/102 |
| 2009/0310679 A1 | 12/2009 | Chang | |
| 2010/0034272 A1 | 2/2010 | Miyazaki | |
| 2010/0079669 A1 | 4/2010 | Hattori | |
| 2010/0141831 A1 | 6/2010 | Weston | |
| 2010/0177239 A1 | 7/2010 | Servais | |
| 2011/0001873 A1 | 1/2011 | Doswald | |
| 2011/0019083 A1 | 1/2011 | Cordes | |
| 2011/0211124 A1 | 9/2011 | Petrides | |
| 2011/0268190 A1 | 11/2011 | Morphet | |
| 2011/0317075 A1* | 12/2011 | Haastrup | H04N 5/21 348/687 |
| 2014/0028909 A1 | 1/2014 | Tanigawa | |
| 2014/0053111 A1 | 2/2014 | Beckman | |
| 2014/0098886 A1 | 4/2014 | Crenshaw | |
| 2014/0104492 A1 | 4/2014 | Liu | |
| 2014/0225941 A1 | 8/2014 | Van Der Vleuten | |

FOREIGN PATENT DOCUMENTS

| | | |
|---|---|---|
| EP | 2018052 | 1/2009 |
| EP | 2046029 | 4/2009 |
| EP | 2234402 | 9/2010 |
| JP | 2012-182691 | 9/2012 |
| WO | 2012/166512 | 12/2012 |
| WO | 2015/077329 | 5/2015 |

OTHER PUBLICATIONS

Roberts, A. "The Film Look: It's Not Just Jerky Motion" R&D White Paper, WHP 053, Dec. 2002, pp. 1-20.

Dikba Salih, "A Low-Complexity Approach for Motion-Compensated Video Frame Rate-up Conversion" Dec. 2011, in partial fulfillment of the requirements for the Degree Doctor of Philosophy in the School of Electrical and Computer Engineering, pp. 1-129.

Aylsworth, W. et al "Stereographic Digital Cinema: Production and Exhibition Techniques in 2012" Proceedings of the IEEE, vol. 101, Issue 1, Jan. 2013, pp. 169-189.

Larimer, J. "41.2: Judder-Induced Edger Flicker in Moving Objects" vol. 32, Issue 1, Jun. 2001, pp. 1094-1097.

Tyler, C. W. et al "Analysis of Visual Modulation Sensitivity. IV. Validity of the Ferry-Porter Law" vol. 7, Issue 4, pp. 743-758, Apr. 1990.

* cited by examiner

Example mapping between speed and dt

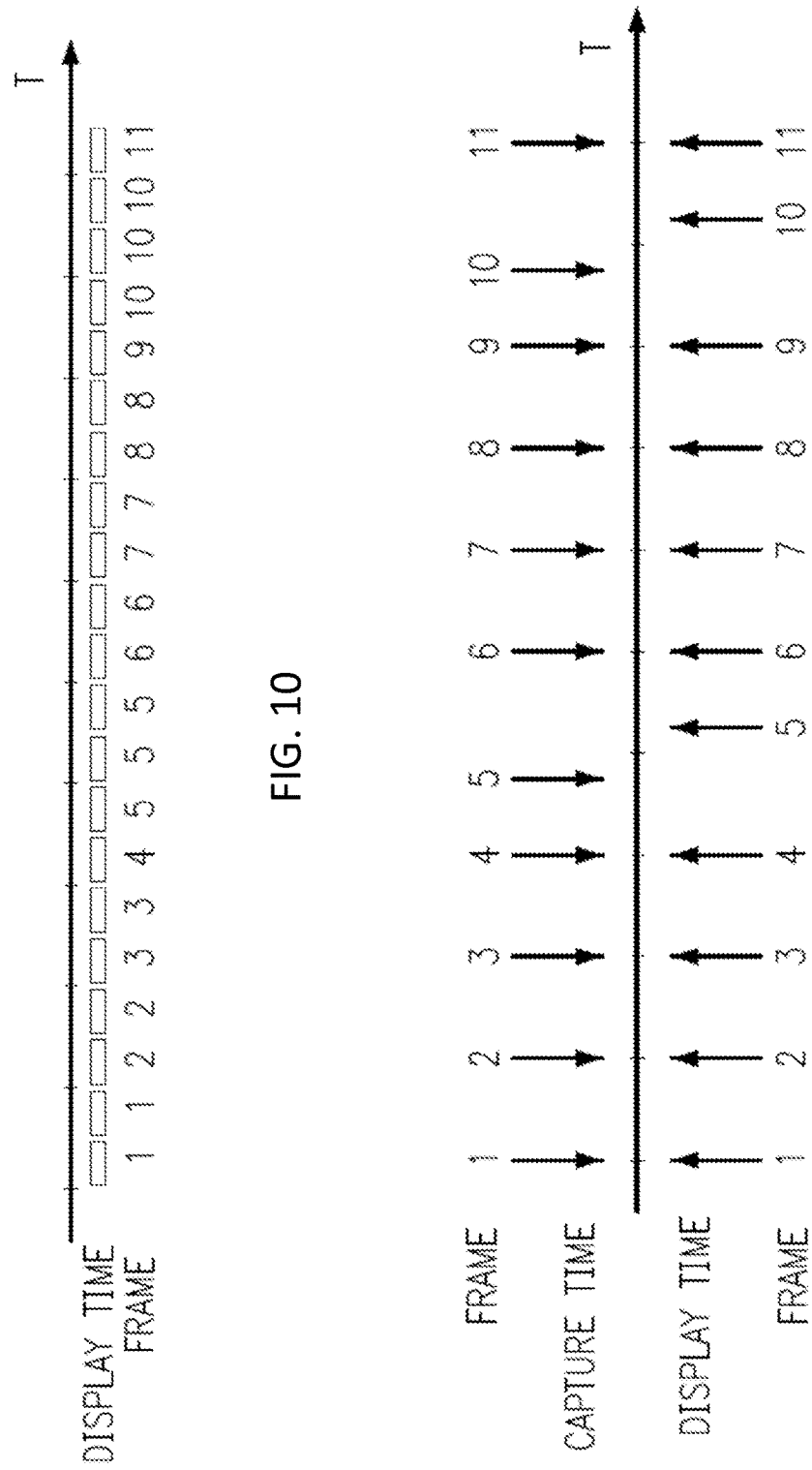

SYSTEMS AND METHODS TO CONTROL JUDDER VISIBILITY

CROSS-REFERENCE TO RELATED APPLICATIONS

This application claims priority to U.S. Provisional Patent Application No. 61/945,706 filed 27 Feb. 2014 and U.S. Provisional Patent Application No. 62/055,555 filed 25 Sep. 2014, each of which is hereby incorporated by reference in its entirety.

TECHNICAL FIELD

The present disclosure relates to video processing. More particularly, it relates to systems and methods to control judder visibility.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 6-14 illustrate different possible approaches to judder control according to an embodiment of the disclosure.

SUMMARY

Figure 1:
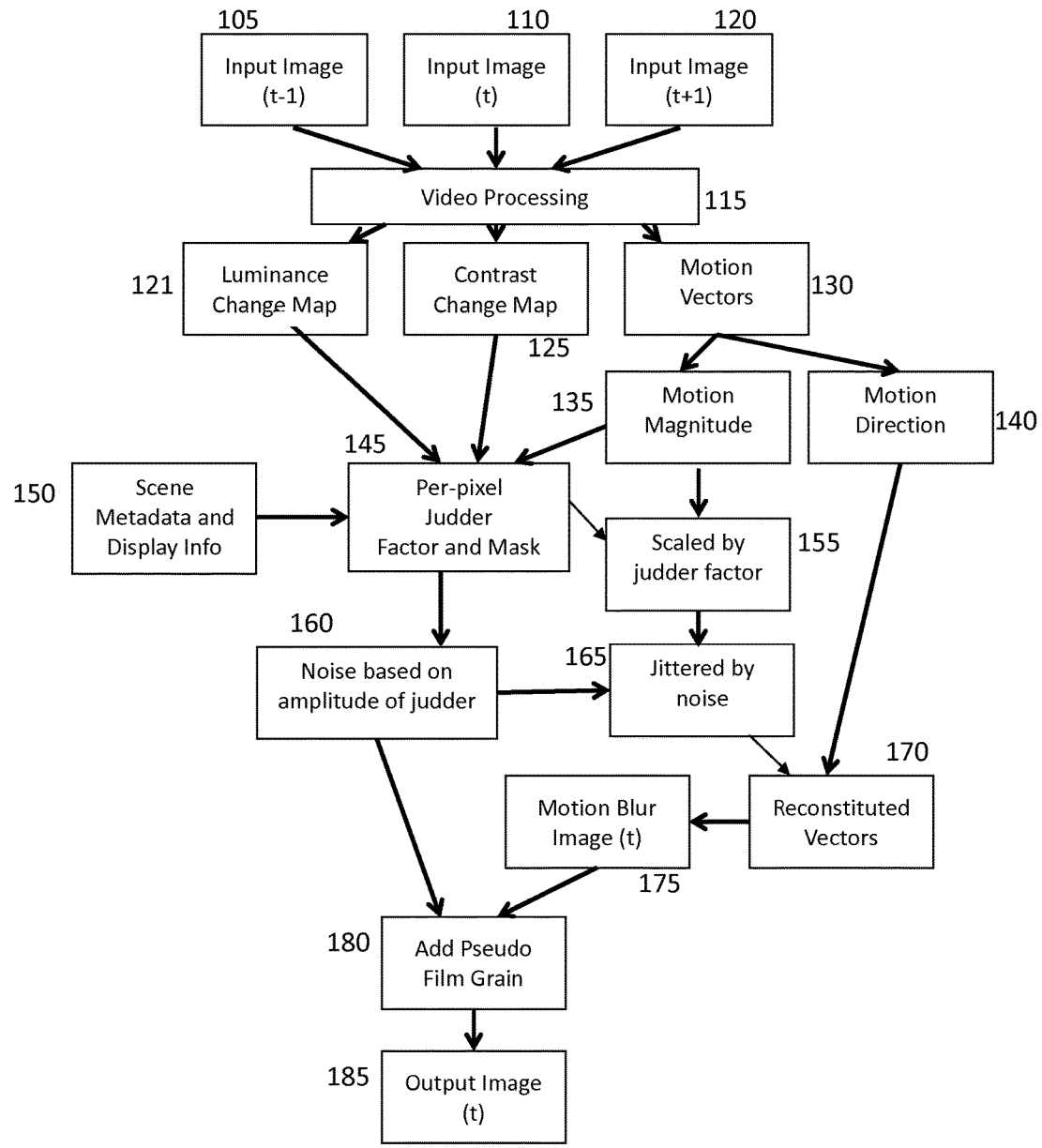
FIG. 1 illustrates a high-level block diagram of one embodiment of processing 24 fps incoming material.

In a first aspect of the disclosure, a method to control judder visibility with a computer is described, the method comprising: accessing a first image and a second image; generating a luminance change map and a contrast change map using the first and the second images; generating a judder map using the luminance change map and the contrast change map, wherein the judder map comprises judder information for the first image; and in response to the judder map, adding noise and motion blur to the first image to generate an output image.

In a second aspect of the disclosure, a method to control judder visibility is described, the method comprising: providing, by a computer, at least two input frames; estimating, by a computer, an interpolation map based on the at least two input frames, thereby obtaining an estimated interpolation map, wherein the estimated interpolation map specifies a temporal interpolation position for at least one pixel of the at least two input frames; and interpolating, by a computer, at least one additional frame, based on the at least two input frames and the estimated interpolation map, thereby obtaining at least one interpolated frame, wherein at least one pixel of the at least one interpolated frame corresponds to at least one pixel at the time specified by the interpolation map of that at least one pixel.

In a third aspect of the disclosure, a method to control judder visibility of high frame rate capturing and high frame rate display is described, the method comprising: capturing frames with non-constant time intervals thereby obtaining captured frames; and displaying the captured frames with constant time intervals, thereby obtaining a desired judder visibility.

In a fourth aspect of the disclosure, a method to control judder visibility of high frame rate capturing and high frame rate display is described, the method comprising: capturing frames with constant time intervals, thereby obtaining captured frames; and displaying the captured frames with non-constant time intervals, thereby obtaining a desired judder visibility.

In a fifth aspect of the disclosure, a method to control judder visibility is described, the method comprising: capturing frames with constant time intervals, thereby obtaining captured frames; and displaying the captured frames with constant time intervals, wherein at least one frame of the captured frames is substituted with its preceding captured frame, thereby displaying the preceding captured frame twice.

In a sixth aspect of the disclosure, a method to control judder visibility is described, the method comprising: capturing frames with constant time intervals, thereby obtaining captured frames; processing, by a computer, at least one frame of the captured frames and at least one of its preceding captured frames, based on a desired judder visibility, thereby obtaining at least one processed captured frame; and displaying the captured frames and the at least one processed captured frame with constant time intervals.

In a seventh aspect of the disclosure, a method to control judder visibility of high frame rate image sequence is described, the method comprising: providing, by a computer, input frames; removing, by a computer, noise or film grain from the input frames, thereby obtaining processed frames; processing, by a computer, the noise or film grain from the input frames, thereby obtaining a low frame rate noise or film grain; and adding, by a computer, the low frame rate noise or film grain to the processed frames, thereby obtaining output frames.

In an eighth aspect of the disclosure, a method to control judder visibility of high frame rate image sequence is described, the method comprising: providing, by a computer, input frames; dividing, by a computer, the input frames in at least two groups of frames; processing, by a computer, at least one of the groups of frames, based on a desired judder visibility, thereby obtaining at least one processed group of frames and at least one unprocessed group of frames; and combining, by a computer, the at least one processed group of frames with the at least one unprocessed group of frames.

In a ninth aspect of the disclosure, a method to control judder visibility with a computer is described, the method comprising: providing, by a computer, at least two input frames; estimating, by a computer, an interpolation map based on the at least two input frames, thereby obtaining an estimated interpolation map, wherein the estimated interpolation map specifies a temporal interpolation position for at least one pixel of the at least two input frames; and interpolating, by a computer, at least one additional frame, based on the at least two input frames and the estimated interpolation map, thereby obtaining at least one interpolated frame, wherein at least one pixel of the at least one interpolated frame corresponds to at least one pixel at the time specified by the interpolation map of that at least one pixel, an output frame rate is an integer number of an input frame rate, and the at least one additional frame is interpolated between the at least two input frames.

In a tenth aspect of the disclosure, a method to control judder visibility is described, the method comprising: providing, by a computer, at least two input frames; estimating, by a computer, an interpolation map based on the at least two input frames, thereby obtaining an estimated interpolation map, wherein the estimated interpolation map specifies a temporal interpolation position for at least one pixel of the at least two input frames; calculating a base frame rate, the base frame rate being an even number of an output frame rate and substantially close in value to an input frame rate, thereby displaying judder similarly to the input frame rate, wherein an output frame rate is a non integer number of the input frame rate; and interpolating, by a computer, at least two additional frames, based on the at least two input frames, the base frame rate, the input frame rate, and output frame rare and the estimated interpolation map, thereby obtaining at least two interpolated frames, wherein at least one pixel of at least one of the at least two interpolated frames corresponds to at least one pixel at the time specified by the interpolation map of that at least one pixel, wherein the at least two additional frames are interpolated between the at least two input frames.

In an eleventh aspect of the disclosure, a method to control judder visibility is described, the method comprising: providing input frames at an input frame rate; capturing, by a computer, frames from the input frames at each time period thereby obtaining captured frames; displaying the captured frames at a frame rate lower than the input frame rate in each time period; and jumping forward in time the captured frames at an end of each time period by an amount necessary to catch up to the input frame rate, thereby obtaining a desired judder visibility.

In a twelfth aspect of the disclosure, a method to control high frame rate judder visibility is described, the method comprising: providing input frames at an input frame rate; calculating, by a computer, a juddering base frame rate; selecting a judder control rate; resampling frames from the input frames at each time period thereby obtaining resampled frames; displaying the captured frames at a frame rate different from the input frame rate in each time period; and jumping forward in time the captured frames at an end of each time period by an amount necessary to catch up to the input frame rate, thereby obtaining a desired judder visibility at an output frame rate equal to the input frame rate.

DETAILED DESCRIPTION

Judder in a motion picture can be simply described as non-smooth motion, but the term is also used to generally describe any consequences of the relatively low frame rate of 24 fps typical in video recording. Some of the resulting distortions, compared to the motion visible in the real-world, due to the frame rate of 24 fps (or other similarly low frame rates) can be broken down into four main components: 1) non-smooth motion (chattering), 2) flickering along moving edges, 3) spatial blur on moving objects, and 4) false multiple edges.

Such distortions are primarily due to a high degree of motion relative to the image update rate (frame rate), as well as consequences originating from spatiotemporal aliasing. As known to the person skilled in the art, the visibility of motion distortions can be described by the spatiotemporal contrast sensitivity function (CSF), referred to as the ST-CSF. The contrast of the object in motion relative to its surrounding areas can affect the visibility, since the contrast is the main input variable into the ST-CSF, determining threshold and overall visibility.

There is also an effect on the visibility of these distortions based on the luminance adaptation of the visual system. For higher luminance levels, the spatial and temporal bandwidths of the ST-CSF increase, with the consequence that the visibility of all four components also increases. New projector designs for cinema are enabling higher maximum luminance and higher contrast. Sometimes the increased maximum luminance is used to raise the average luminance level, and other times it is used to only increase the object's contrast. Both of these improvements have a negative side effect, in that they increase the visibility of all four components of judder. Unfortunately, the previously acceptable levels of judder can now become objectionable.

In other words, content graded for 100 nits standard dynamic range displays or 48 nits film screen shows objectionable judder when re-graded to extended or visual dynamic range displays, for example, an 800-nits TV display or 110 nits film screen. The reason is that higher brightness and higher contrast increase judder perception, as shown in psychophysical experiments.

Psychophysical experiments have studied how different factors affect the perception of motion judder, using Gabor and customized contrast-frequency test patterns as well as real image sequences as stimuli. The results show that judderness can have a strong relationship with different variables including the frame rate, motion speed, brightness, contrast, shutter angle, and etc. There exists a cut-off frame rate for perception of judder: beyond this frame rate, there is no judder perception, while below this rate, judder perception increases when frame rate decreases. At the same frame rate, therefore, judder perception increases as the motion speed, brightness, and contrast increases, and decreases as the shutter angle increases.

In many imaging applications, the goal of improvements in motion quality is to reduce all four judder components as enumerated above, and the window of visibility provides a clear path toward such improvement. One way to reduce judder is to increase frame rate or to reduce spatial and temporal resolution at the capture or display stage. However, for cinema, some of these components are actually desired at certain amplitude levels, as they contribute to the 'film look' often desired by cinematographers and other professionals in the movie industry. They are important in making cinema look different from video, which due to its relatively higher frame rate has much smoother motion, and sharp moving edges. While some of the details behind the preferences of the film look are unknown, it has been supposed that the motion blur (due to a hold-type blur and smooth pursuit eye movement interaction often discussed in the LCD display industry) is preferred for similar reasons to those related to the fact that the cinema practitioners often prefer a shallow depth of field for focus. It reduces visible details unnecessary to the storytelling, which can be considered distractions. Other theories are that cinema should not be too realistic, as that hinders the imagination of the viewers. A third key theory is that there is a strong association by filmgoers with some of the judder components towards the film look, and as a consequence film viewers prefer movies not to have the more realistic motion quality of video. As a consequence of these complex factors, methods are needed that do more than simply remove judder (such as by increasing the frame rate of capture and display, or by using motion interpolation to increase the frame rate of a given source). Such methods must manage judder; that is, keep the desirable components perceptually similar to the traditional cinema despite the increase in contrast and luminance levels. These approaches to judder management are the subject of the present disclosure. In addition to preserving the judder component levels at the previously acceptable levels from cinema, the present disclosure describes systems and methods that can allow the director or cinematographer to control aspects of the judder appearance, ranging from the traditional look to the more natural 'video motion' look, including various states in between, both globally and locally.

Another approach to address motion artifacts is through control of the recording process. The American Society of Cinematographers has provided guidelines about capturing motion in a scene, such as the "7 second rule" (an object should take 7 seconds to cross the camera frame). These rules were developed for the luminance levels and contrasts from traditional projectors. However, given new display technology, any existing content will require re-evaluation for judder, and in a real world production environment, it may not be possible to judge the amount of judder perception a priori, during content creation. Many displays have a native frame rate high enough that judder is never present, and a proper film look is not naturally attained. Therefore, a semi-automated process to control the perception of judder by the director/cinematographer/post-producers, as well as viewers, is desired.

Common post production methods of masking judder are as follows.

1. Lowering overall picture brightness level until judder is acceptable. This method is in conflict with the desire for higher brightness and higher contrast in displays, and artificially constrains artistic intent.

2. Adding motion blur to fake a longer shutter on the camera, which smears pixels based on the amount and direction of motion. This method can have a negative impact on the details present in the scene, where all objects moving will lose details. To obviate this potential problem the minimal amount of motion blur is added, which may not work for future display technology. In fact, the amount of pure blur necessary to hide the juddering may be so large that it violates a physically plausible camera shutter, adding a new negative appearance to the film.

3. Interpolating between images to a higher frame rate, or capturing at a higher frame rate, where the motion from frame to frame is reduced. This method is the preferred mode for most solutions, currently, however, this method also has a negative psychological impact on the scene where people remark that it no longer "feels" like film. This method may also not be possible with some display technologies.

The present disclosure describes systems and methods that can allow the director or cinematographer to control aspects of the judder appearance, ranging from the traditional look to the more natural 'video motion' look, including various states in between, both globally and locally. The present disclosure can provide a codified measure of how much judder a user might perceive at a particular location, and provides an approach to add adaptive correction only in targeted areas. Additionally, the corrections can be modified to preserve apparent details and the perception of the film "look".

In U.S. Provisional Patent Application No. 61/945,706, "Systems and methods to control judder visibility", filed on Feb. 27, 2014, different approaches have been described to control judder visibility of low frame rate content, for example by doubling the frame rate with controllable judder visibility globally and locally. In addition, several methods are proposed for controlling judder with high frame rate capturing and displaying. The disclosure of U.S. Provisional Patent Application No. 61/945,706 is incorporated herein by reference in its entirety. Additionally, several concepts from U.S. Provisional Patent Application No. 61/945,706 are reproduced herein for reference purposes.

1. Unchanged Frame Rate Process

The unchanged frame rate process can provide a way to reduce judder while leaving the frame rate unchanged. FIG. 1 illustrates a high-level block diagram of one embodiment of processing 24 fps incoming material, and can be the final output used when temporal interpolation is not possible because the display is limited to 24 fps. At higher input frame rates, additional processing would be added to adjust for the "film feel". Additional image attributes, such as saliency or object identification, are envisioned to enhance the results.

In FIG. 1, input images at time t (110), t−1 (105) and t+1 (120) are subject to temporal processing (115). Video processing (115) comprises motion estimation (130), where motion vectors are estimated. The temporal differences between input images (105, 110, 120) are also calculated for luminance (121) and contrast (125), or other measures of the amount of change present from frame to frame. Motion estimation and other change measurements may be improved by incorporating more surrounding frames. Motion estimation (130) comprises the estimation of two sets of motion vectors, one set of forward motion vectors, and one set of backward motion vectors. This forward and backward sets are computed separately, and enable the computation of the motion estimates with higher accuracy.

The motion vector estimation comprises the determination of the vectors' direction (140) and the vectors' magnitude (135). The vectors' magnitude (135), the luminance change map (121) and the contrast change map (125) are used to determine a normalized judder map (145), with judder values for each pixel describing how much judder is apparent. A simple embodiment of this method would be to sum each component using a weighted scheme, such as w0\*vector_magnitude+w1\*luminance_change+w2\*contrast_change into a single number varying between 0 and 1, where 0 means no judder apparent, and 1 corresponding to the maximum amount of judder. Other statistical measures may be used to more accurately vote between the inter-related input parameters. In some embodiments, the judder values may be calculated for a subset of the totality of pixels. Scene and display metadata (150) may also be used to determine the judder map (145). For example, the brightness of a scene and the dimensions and luminance of a display may be employed. As known to the person skilled in the art, the bigger the screen, the more judder is visible. Scene and display metadata (150) can affect the perception of judder. For example, the perceived judder increases as the brightness increases. The overall scene brightness can be carried in the scene metadata (150) and thus be used in determining the judderness. The display metadata (150) could include the maximum brightness of the display, as well as the size of the display, both of which could affect the perceived judder.

Noise (160) to be added can be calculated based on the amount of judder per pixel (145). The motion magnitude of the vectors (135) can be scaled (155), based on the judder map (145). After scaling (155), noise (jittering) is added (165) to the motion magnitude based on the amount of judder. The noise is measured (160) based on the judder map (145). For example, the bigger the magnitude of the judder, the higher the noise that will be added.

After jittering (165), the motion magnitude and direction are used to reconstruct the motion vectors (170). Jittering is used here to indicate temporal offsets. Motion blur (175) is added to the image based on these motion vectors. Pseudo film grain (180) is also added, based on the amount of noise to blend with the original image so the motion blur appears to be part of the original capture. Noise amplitude, size or distribution may be adjusted based on the amount of judder. A final output image is obtained (185). In some embodiments, the process herein described is performed on one or more pixels of an image or in a weighted manner.

2. Frame Rate Adjustment Process

When alternative frame rates are possible, either by capturing at a higher frame rate, or interpolating a lower frame rate and displaying at a higher frame rate, additional processing is enabled. This allows for the presentation to have an enhanced "film feel" without the negative side effects of strong judder. It is possible to introduce non-smooth motion at a higher frame rate in the areas with objectionable judder so that the perceived judder would get reduced to an acceptable range without being eliminated, while the majority of the image without excessive judder will be updating at a lower frame rate. Therefore, overall the image sequence, when played at the higher frame rate, will keep the visceral "film feel". In other words, excessive judder is reduced in local areas while leaving other areas untouched. Some areas of the final image will be based on the higher frame rate picture, while other areas will be based on the lower frame rate picture.

For example, given an input at 24 fps, in order to offset the increased judder feeling due to the increase in display/projector brightness, one option is to increase the frame rate. The required increase in frame rate, which could effectively reduce the same amount of increased judder caused by brightness, can be modeled by psychophysical experiments. However, the adjustable frame rate range can be limited between 24 fps and 48 fps, as in 48 fps there is usually no judder perceived. It may be impractical to interpolate the 24 fps sequence to an arbitrary frame rate below 48 fps and display it at that arbitrary frame rate, although this might be more practical when frame rate conversion and display techniques advance. A formal description of this solution can be: given a 24 fps scene/sequence of images graded for first display brightness, find out an optimal second frame rate so that after converting the frame rate from 24 fps to this second frame rate, the content played back on an output display with a second display brightness will have the same amount of perceived judder as when the original 24 fps content is played on a display with the first display brightness.

More practically, display and projector are normally available for 48 fps, 60 fps, and some other standard frame rates. In this case, using frame rate conversion can eliminate all the judder perception as no judder is seen in such high frame rates, if the temporal interpolation is done properly.

One possible method attempts to identify the areas with excessive judder and only updates these areas at the higher frame rate, while keeping the other areas playing back at a lower frame rate. This method shows improved results compared to the method of updating every part of a picture to a higher frame rate, as the judder feeling is kept in most of the areas although it is eliminated in the areas with excessive judder.

A solution as described herein could be applied to reduce the excessive judder to an acceptable level, so as to keep the perceived judder when playing back a 24 fps content at a higher frame rate. For example, it is possible to introduce locally-variable non-smooth motion at a higher frame rate, so as to introduce a locally controllable judder feel. With that capability, the proper amount of judder can be turned on in areas with excessive judder. It is also possible to turn on the judder in other areas to the full possible amount of judder at 24 fps, and ensure smooth changes of the judder feeling, spatially and temporally. The methods described herein are explained in the following with an exemplary output frame rate of 48 fps, however the person skilled in the art will understand that other output frame rates may be possible.

Human perception of judder from smoothly moving objects can be explained by edge flickering according to, for example J. Larimer et al., "Judder-induced edge flicker in moving objects," in *SID*, 2001, the disclosure of which is included herein by reference in its entirety.

Figure 2:
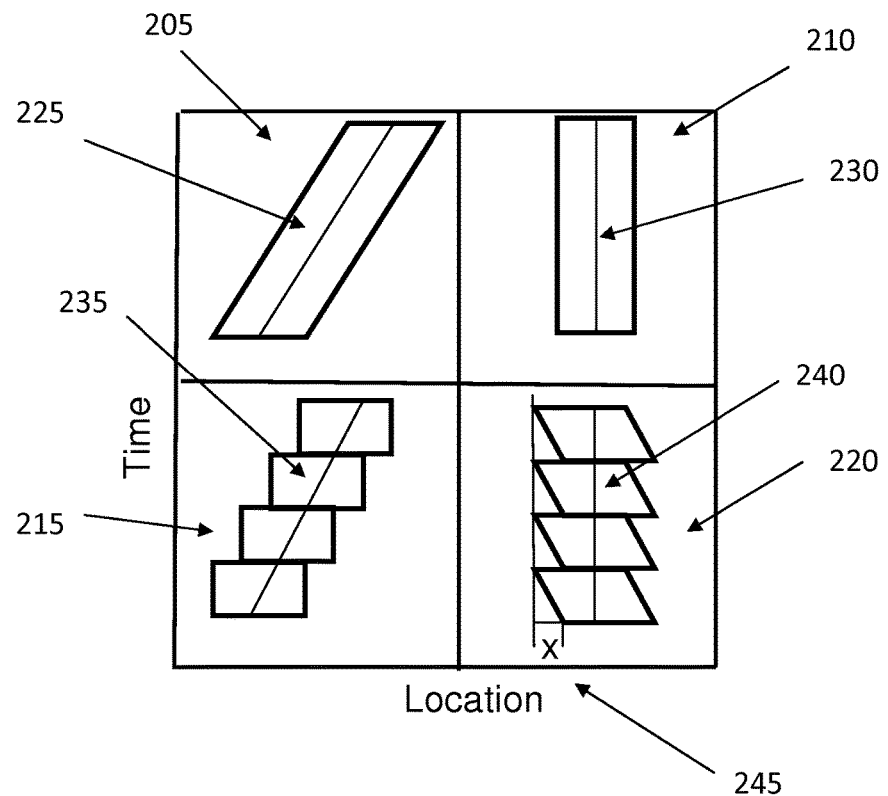
FIG. 2 illustrates distortions due to temporal sampling (bottom) of smooth motion (top) for the case of world co-ordinates with no eye movements, i.e. fixation (left half) and retinal motion in the case of tracking eye movements (right half).

FIG. 2 illustrates some concepts related to judder control. In FIG. 2 it is assumed that a line segment is moving from left to right across a screen and the viewer is tracking the line segment with Smooth Pursuit Eye Movement (SPEM). The top row (205, 210) shows the space time trajectory of the line (225, 230) in real life, i.e., a continuous domain, while the bottom row (215, 220) shows the space time trajectory of the top row (205, 210) when it is sampled at 24 fps and played back on a hold-type display.

In FIG. 2, on the left side (205, 215), the spatial location is represented in world coordinates, while on the right side (210, 220), the location is represented in coordinates of the viewer's retina, with SPEM. The central line (225, 230, 235, 240) shows the space time trajectory of the eye gaze, as the viewer is tracking the object. Therefore, the panel (205) shows the line segment moving from left to right, and this motion in retinal coordinates is shown in the panel (210). When the moving line is sampled and reconstructed on a hold-type display, it is possible to see a stair step-like trajectory in panel (215). When this trajectory is represented in retina coordinates while the viewer is tracking the object, it is possible to see a saw-tooth-like edge in the space time trajectory in panel (220). Therefore, at the edge of the line segment, it is possible to see motion blur, with the color ramping up from background color to the line color. At the same time, it is also possible to see flickering, as the frame rate is 24 fps, a frequency way below the critical fusion frequency (CFF). The flickering and motion blur are usually what is seen as judder in 24 fps playback. In panel (220), the depth of the saw-tooth shape is marked as x (245), which is the displacement per frame for the line segment, i.e., the speed of the line segment. From psychophysical experiments, it is known that the perceived judder magnitude is positively correlated to the motion speed, thus the perceived judder will increase when x increases, and decrease when x decreases.

Figure 3:
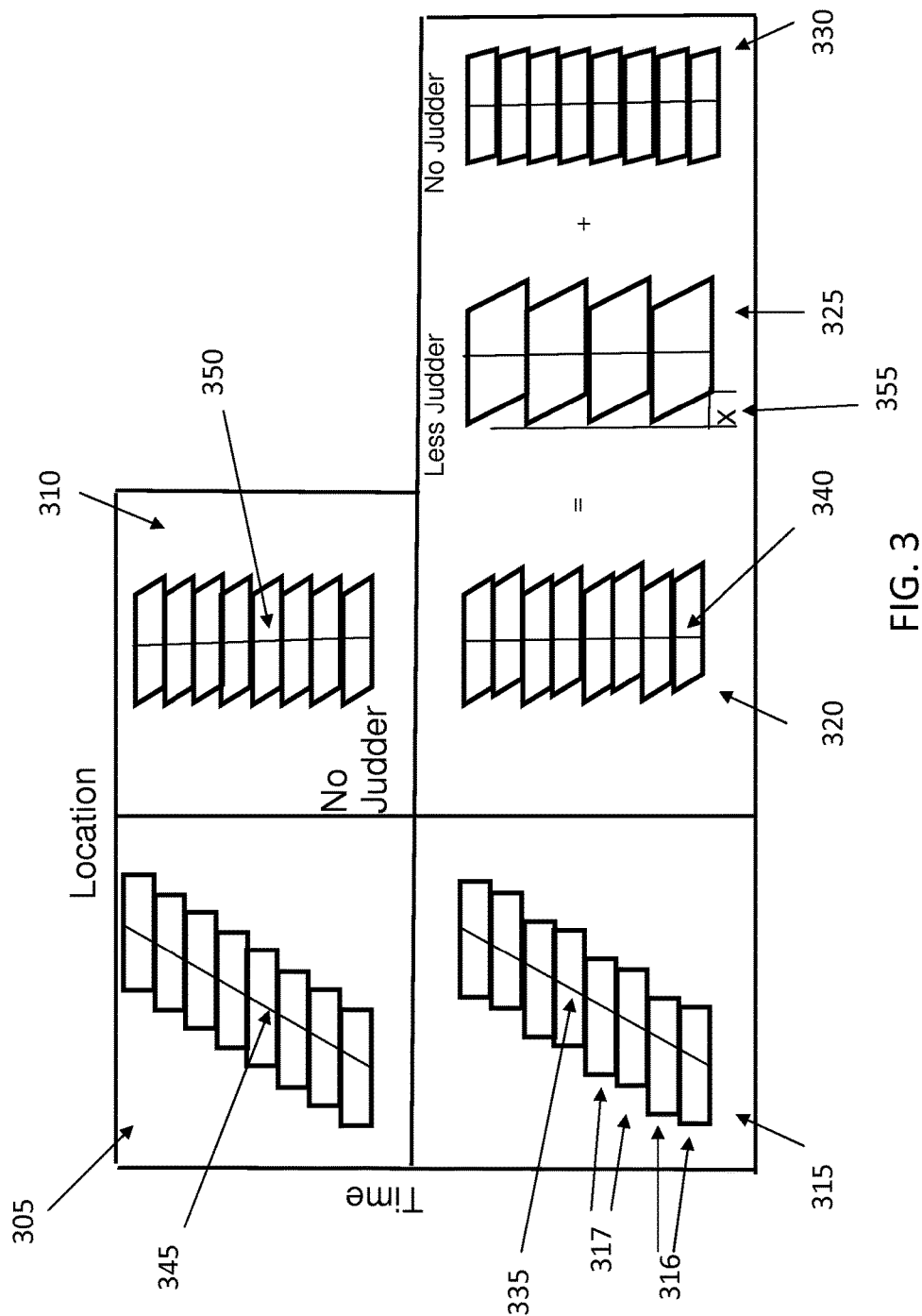
FIG. 3 illustrates the motion of a line segment sampled at 48 fps and displayed on a 48 fps hold-type display.

FIG. 3 illustrates what happens if the motion of the line segment is sampled at 48 fps and displayed on a 48 fps hold type display. In FIG. 3, the top row (305, 310) shows the space time trajectory of a smoothly moving line segment on a hold-type display (305) and on a retina of a viewer looking at the display with SPEM (310). As it can be seen in (310), the edge flickering is much less than that in (220) of FIG. 2, as the displacement is about half in value, and more importantly, the frequency is 48 fps, which is approaching the CFF. In practice, a sharper image can be observed with less motion blur, and usually no edge flickering.

Therefore, if the input 24 fps content is interpolated to 48 fps with frame rate control (FRC), with interpolated frame temporally located at t+0.5, there will be no judder perceived. This is not necessarily advantageous, as an intended purpose is to reduce the excessive judder instead of eliminating it.

FIGS. 2 and 3 also show the result of interpolating the input content at 24 fps to 48 fps with frame rate control (FRC), with interpolated frame temporally located at t+0.5.

In FIG. 3, the bottom row (315, 320, 325, 330) shows the space-time trajectory of a line segment moving from left to right with non-smooth motion at 48 fps. Specifically, the line segment (335) is moving left for a small gap for the first half (316), and a large gap for the second half (317) of a 24 fps period. The central line (335, 340) remains the same as the line (345, 350) of the top row (305, 310) as the eye is tracking the motion. In other words, (315) can also be interpreted as an interpolation of a 24 fps input content to 48 fps, with interpolated frames temporally located at t+dt, where dt<=0.5. Therefore, (315) can also be interpreted as an interpolation of a 24 fps input content to 48 fps, with interpolated frame temporally located at time dt between two consecutive frames, where dt=x1/(24x) second.

Figure 17:
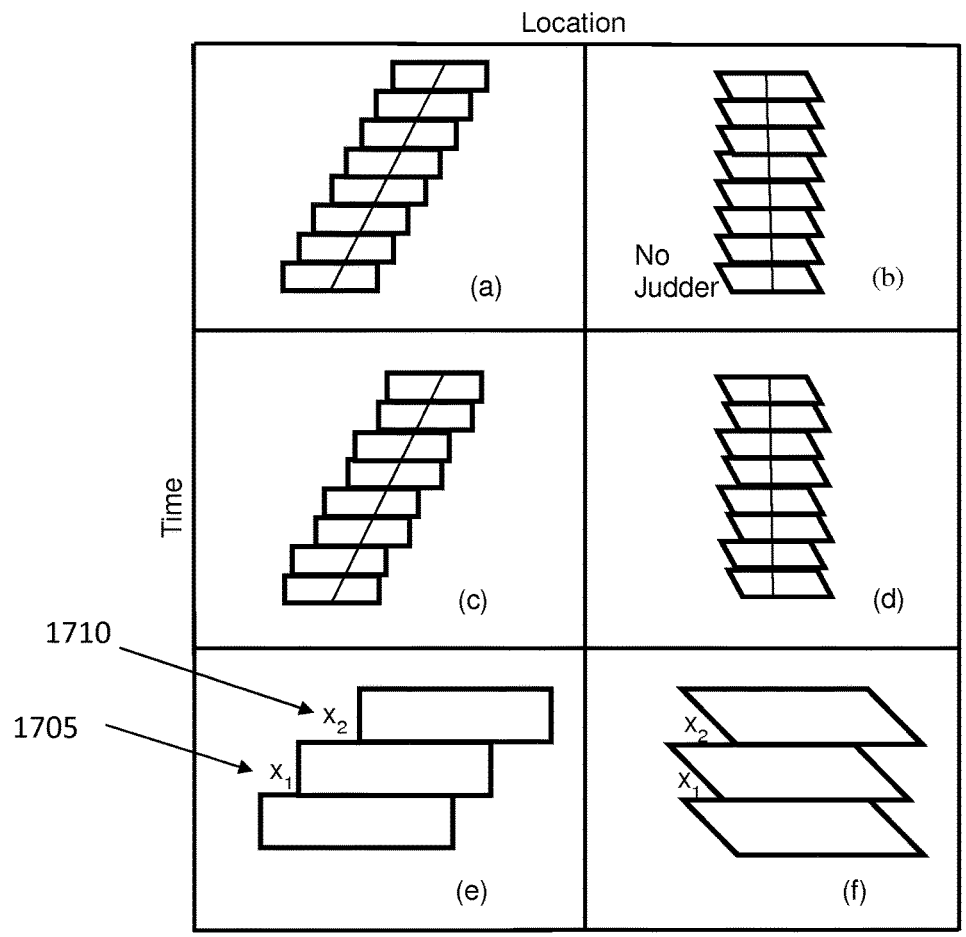
FIG. 17 illustrates some concepts related to judder control.

The small gap for the first half (316), and a large gap for the second half (317) can also be seen more in details in FIG. 17, as x1 (1705) and x2 (1710), with x1+x2=x.

Referring back to FIG. 3, when the space time trajectory in (315) is represented on the viewers' retina as in (320), the trajectory in (320) can be decomposed into two components: a 24 fps component (325) and a 48 fps component (330). Component (325) is very similar to the trajectory in (220) of FIG. 2, which will be perceived as judder, while component (330) in FIG. 3 is very similar to the trajectory in (310) which shows no judder. The difference between (325) in FIG. 3 and (220) in FIG. 2 is that the displacement x (355) in (325) is smaller than the displacement x (245) in (220), as x (355)=$x_2-x_1$=x (245)-2*$x_1$. The displacement x (335) can also be termed as x'. FIG. 2 and FIG. 3 are not to scale relative to one another therefore the relative length of the displacement x (355, 245) in FIG. 2 and FIG. 3 may appear different than hereby stated. Based on the analysis above, a smaller displacement x (355) corresponds to a slower motion speed and thus causes less judder. At the same time, component (330) will have no judder as it is 48 fps and has even less motion speed compared to (310). Overall, the space time trajectory (320) on the retina will show reduced judder compared to (310).

The displacement in (320) is the sum of the displacement (355) in (325) and the displacement in (330). Therefore, the displacement (355) will be smaller than the displacement in (320).

The displacement x (355) is controllable as it is possible to interpolate the in-between frame of the 48 fps stream at a different temporal position dt. The formula for calculating interpolation position dt is $$dt=\frac{1}{2}x'/(2x).$$

If dt=0 (and x'=x), or dt=1, the same effects as in (220) in FIG. 2 are obtained, with original judder. If dt=0.5 (and x'=0), the same effects as in (310) in FIG. 3 are obtained, where there is no judder. For other values between 0 and 1 (x' values between 0 and x), the perceived judderness can be controlled to a desired degree between the two cases for dt=0 and dt=0.5. The non-smooth motion can also be obtained via interpolation at dt'=1−dt, which will have the same amount of judder as interpolation at dt.

In some embodiments, dt<=0.5 is chosen for judder reduction, while a value on the other side of 0.5 will have similar effects. The same technique can be used to introduce judder perception for organic high frame rate content, where judder can be injected with non-smooth motion.

Figure 4:
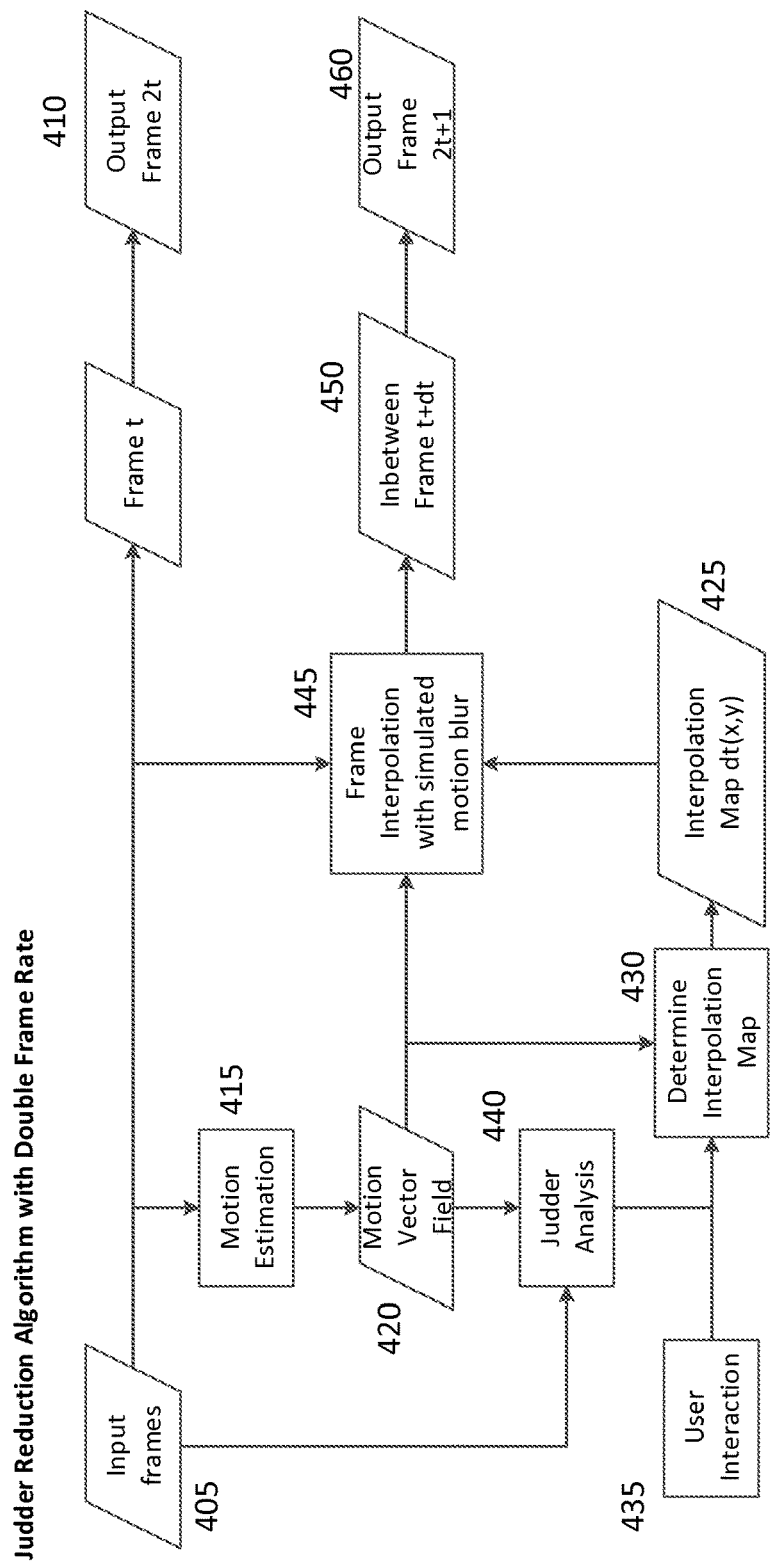
FIG. 4 illustrates a process for judder reduction with a 24 fps input and 48 fps output according to an embodiment of the disclosure.

For judder reduction with a 24 fps input and 48 fps output, an algorithm can be implemented with the diagram shown in FIG. 4. An interpolation position map M (425) can be generated (430), so that for each pixel (x,y), the pixel will be interpolated at a temporal position: dt=M (x,y).

In this embodiment, the frame rate of the output is twice the frame rate of the input. For simplification, every input frame (405) can be directly copied as output frame (410), and one frame can be interpolated between (455) every pair of neighboring original input frames, to obtain an output frame (460).

A frame can be analyzed (440) to determine how much judder it contains. In an embodiment, judder analysis (440) may be performed as discussed in the judder control process depicted in FIG. 1. In another embodiment, an alternative judder analysis technique is discussed next, referring to FIG. 4.

To obtain an interpolated frame, the input frames (405) are first used to estimate (415) a motion vector field (420) for each pixel. For each pixel (x,y), a forward motion vector $mv_f(x,y)$ and a backward motion vector $mv_b(x,y)$ are obtained. Based on these two motion vectors, a temporal motion consistency $C_t(x,y)$ for pixel (x,y) can be defined by comparing the forward and backward motion vectors, and a spatial motion consistency $C_s(x,y)$ can be defined by comparing the forward and backward motion vectors with its neighboring pixels. In addition, a forward motion vector $mv_f(x,y)$ of each pixel (x,y) can be used to find a corresponding pixel (x',y') in the next frame, such that the forward motion vector of the pixel $mv_f(x,y)$ can be compared with the backward motion vector of its corresponding pixel in the next frame, i.e., $mv_b(x',y')$ to determine a forward motion consistency $C_f(x,y)$.

Similarly, a backward motion consistency $C_b(x,y)$ can be determined by comparing a pixel's backward motion vector $mv_b(x,y)$ with the forward motion vector of its corresponding pixel (x",y") in its previous frame, i.e., $mv_f(x",y")$ where the corresponding pixel (x",y") is determined by the backward motion vector $mv_b(x,y)$ of the pixel (x,y). In one embodiment, these motion vector consistencies are defined as the magnitude of the summation of the motion vectors divided by the average magnitude of the motion vectors. For example, $$C_f(x, y) = \frac{2|mv_f(x, y) + mv_b(x', y')|}{|mv_f(x, y)| + |mv_b(x', y')|},$$

where |u| is the magnitude of u. In one embodiment, a modified motion magnitude m(x,y) can be defined for each pixel (x,y) as the greater of the forward motion magnitude times the forward motion consistency and the backward motion magnitude times the backward motion consistency. This modified motion magnitude is further multiplied by the temporal motion consistency, e.g.

$$s(x,y)=\max(|mv_f(x,y)|*C_f(x,y),|mv_b(x,y)|*C_b(x,y))*C_t(x,y).$$

A Gaussian filter is applied to this modified motion magnitude s to obtain a smooth map of motion speed s'. In practice, the mapped interpolation position M(x,y) for pixel (x,y) will be determined by the motion speed s'(x,y). This mapped interpolation position can also be modified based on judder analysis results, and can be controlled by user interaction. For example, the user (435) at post production can determine which portion of a scene contains excessive juddering and can tune the displacement map so that the results will contain the proper judder.

In one embodiment, the interpolation map M (425) can be computed based on a smoothed motion speed s' obtained before. For example, the relationship between motion speed s'(x,y) of a pixel (x,y) and interpolation position M(x,y) can be a soft switching function between two speed thresholds, T1 and T2, with minimum interpolation position 0, and maximum interpolation position 0.25, as shown in FIG. 5.

Figure 5:
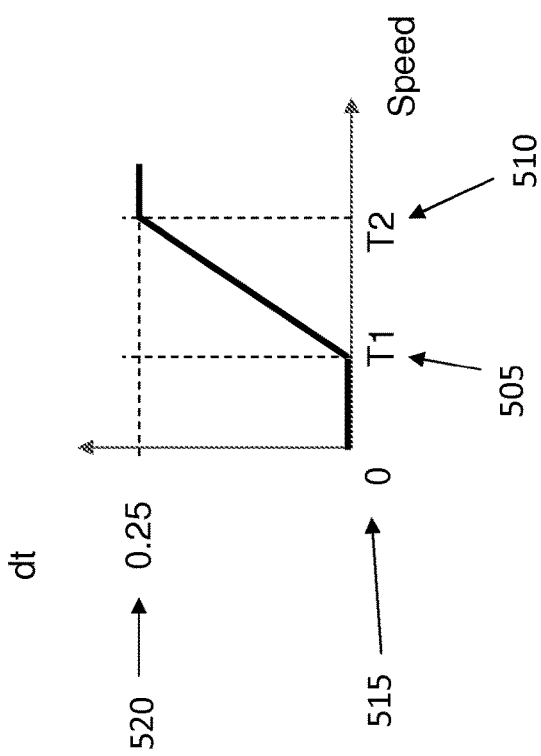
FIG. 5 illustrates an exemplary mapping function as a function of speed according to an embodiment of the disclosure.

In FIG. 5, T1 (505) and T2 (510) are the speed thresholds while M(x,y)=0 (515) is the minimum interpolation position and M(x,y)=0.25 (520) is the maximum interpolation position.

Given a pair of original input frames and the interpolation position map M, a standard frame rate conversion method can be applied at each pixel (x,y) to obtain an interpolated result at corresponding interpolation location M(x,y). Motion blur can be simulated also based on the motion estimation results, where in one embodiment, the amount of motion blur is proportional to the interpolation position, i.e., the further away the interpolation position is from its nearest original input frames, the more motion blur is applied. Motion blur can be obtained, for example, by applying a box filter or Gaussian filter along the motion direction. In another embodiment, the motion blur is simulated by averaging the sampled frames between the first input frame and the interpolated frame. In this case, all the sampled interpolation frames can be computed first and averaged for each pixel based on the interpolation position map M.

There are several application scenarios for the judder management approaches of the embodiments above. First of all, as a tool for post production, the studio can directly generate the de-juddered output content at 48 fps and the content will then be played back by compatible projectors. The post production process can also generate metadata for digital cinema projectors with real time dejuddering. The metadata can also be used to guide FRC in consumer devices. Metadata can take multiple forms, comprising an indicator for which scene needs judder reduction, as well as a parametric mapping function defining how to generate the interpolation position map for a particular scene.

The methods described in the present disclosure can also be directly applied in both projectors and consumer devices for real time fully automatic judder reduction. The present disclosure describes algorithms that can be implemented in hardware devices such as encoders, decoders, projectors and consumer devices.

3. High Frame Rates and Judder Control Process

In some embodiments, related to the methods described above, it is possible to skip to the step where the 48 fps or higher stream is already available. As assumed above, this may be done via interpolation. Alternatively, it may be done by capturing the content with a high frame rate camera in the first place. Then, the concern becomes how to best display the available images so that an appropriate level of judder is present in order to preserve the film look.

3.1. Using Non-Smooth Motion to Simulate Judder

The main idea is to introduce non-smooth motion in the high frame rate content so it would show judder-like perception even if the content is played at a high refresh rate.

Non-smooth motion can be introduced either at the capture end, during post production, or at the projector/display end. In the following subsections, three methods will be described based on where the non-smooth motion is introduced into the high frame rate system.

3.1a

In some embodiments, the motion pictures will be captured in a non-smooth fashion, i.e., with a non-constant time interval between capturing each frame. The motion pictures captured in this non-smooth way can then be projected on a projector which projects the consecutive frames with a constant time interval. Thus the perceived content will have a non-smooth motion introduced, which provides a judder feeling in playback of high frame rate content.

Figure 6:
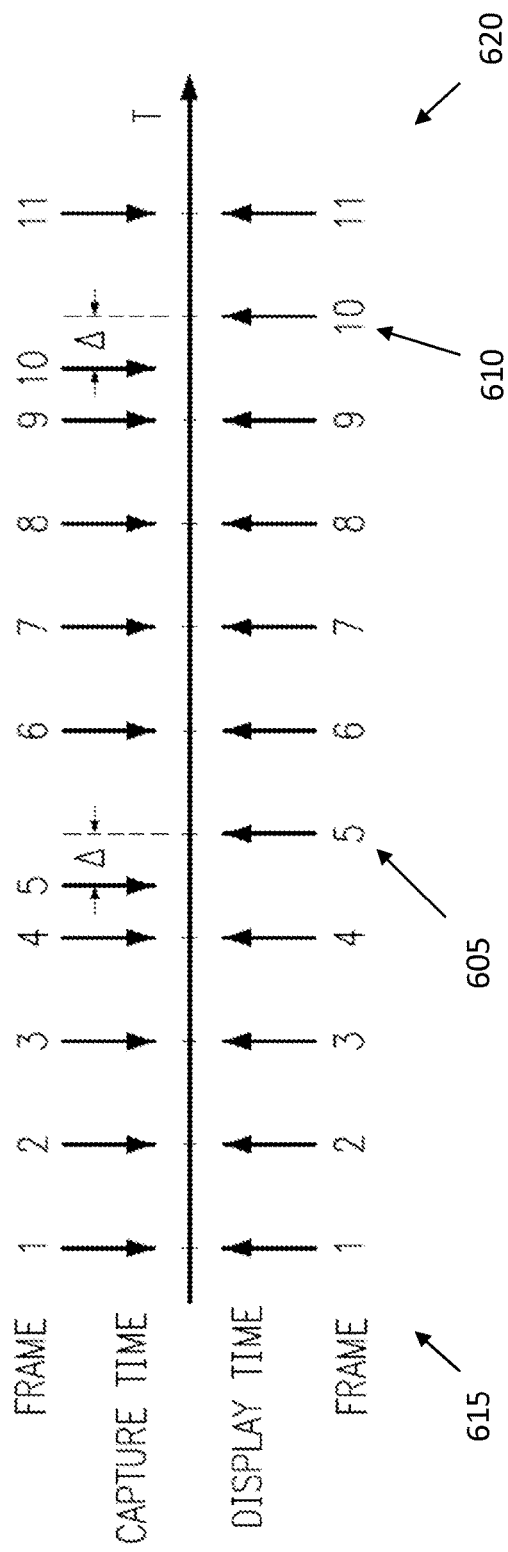

For example, let the frame index i be i=0, 1, 2, . . . , and the time each frame is captured noted as t(i). For regular capture with constant time interval dt, the capture time t(i)=i*dt, where dt is the time between two frames. For example, when the frame rate is 120 fps, dt=1/120=8.333 ms. For non-smooth capture, it is possible to change the capture time of a subset of the frames to move the capture time a little earlier or later in time (e.g. every 5th frame for the 120 fps capture, so that something can be introduced at a 24 Hz frequency). Mathematically, it is possible to set t(i)=i*dt+δ, where δ is non zero if mod(i, n)=0, and δ=0 otherwise. If n is set to be 5 for a 120 fps capture, it means that for every five frames, one of the frames is captured at a different time stamp. This is shown in FIG. 6. The frames captured in this method will still be shown in a constant interval playback on the display side. In FIG. 6, it can be seen that the 5$^{th}$ (605) and 10$^{th}$ (610) images presented on the display would be captured at an earlier time. If it is assumed that there is an object moving from left (615) to right (620) at a constant speed, on the display, the object will then move at a constant speed from frame 1 to frame 4, slow down between frame 4 and frame 5, and speed up from frame 5 to frame 6. This non-smooth motion will be perceived as a kind of motion artifact similar to judder.

Figure 7:
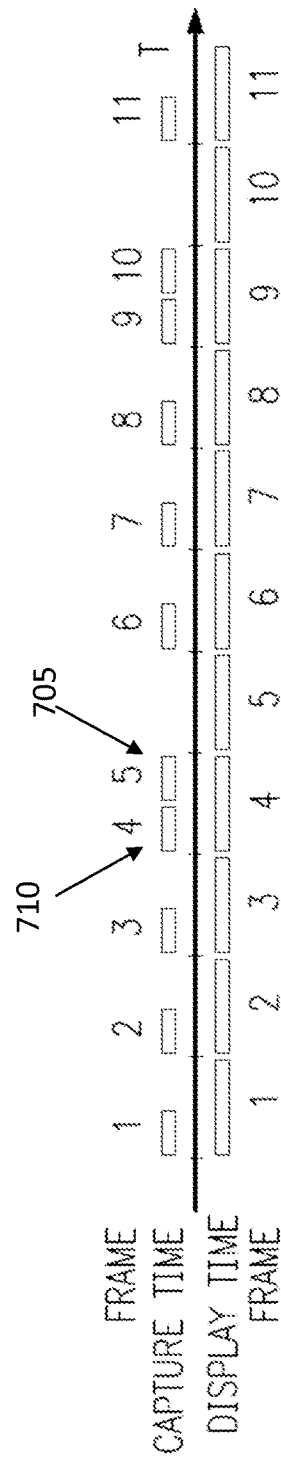

FIG. 7 shows an example with 180 degrees shutter capture. For every 5$^{th}$ frame, the capture time is shifted by half of dt, i.e., the 5$^{th}$ frame (705) is captured immediately after the 4$^{th}$ frame (710). Similarly, on the display side, the captured motion pictures are projected at a constant time interval of dt.

Current cameras might not support changing capturing time when capturing videos. One way to implement the embodiment here described is to use a video camera that is capable of capturing higher frame rates. For example, using a camera with 240 fps and 360 shutter degrees, it is possible to capture the sequence as shown in FIG. 7.

3.1b

Figure 8:
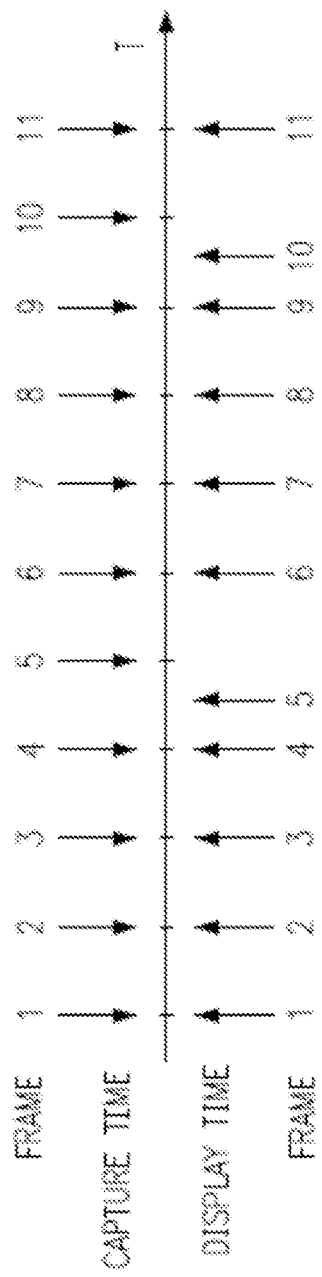
Figure 9:
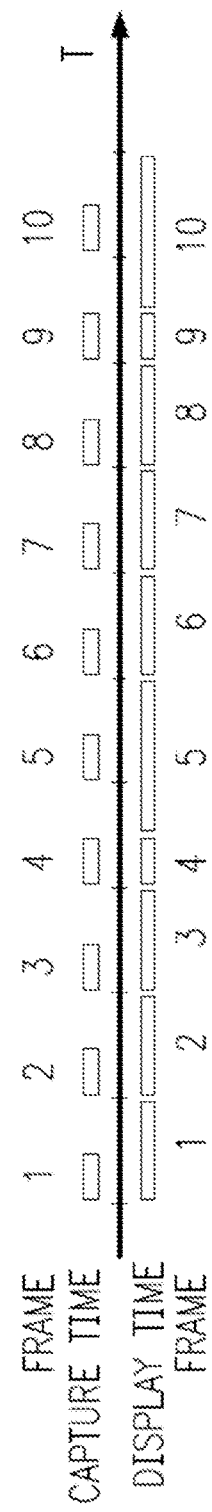

Similarly to the embodiment above, it is possible to change the projector system so that it will project the frames at non-constant time interval. An example is shown in FIG. 8. Considering a 180 degree shutter angle of capturing and full period hold time of the display, it can be seen the actual capture and display of each frame is as in FIG. 9.

In this example, the presentation time-stamp of each frame is changed. However, this embodiment it might not be supported by certain display systems. The effect can be simulated using a higher frame rate projector/display, as shown in FIG. 10.

Figure 12:
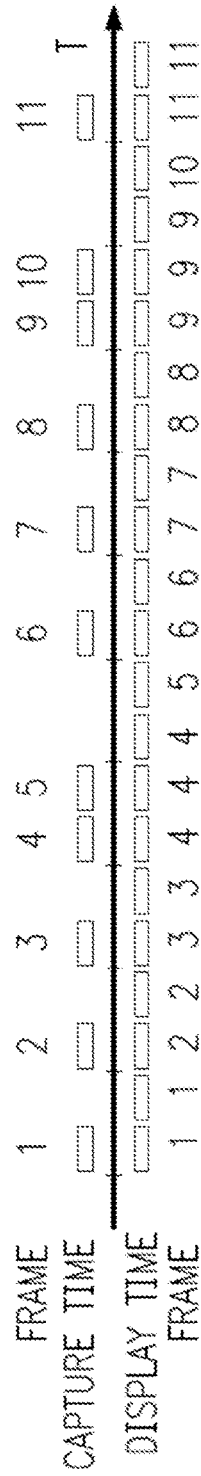

The two embodiments above can be combined together to have more flexible control of the judder perception, for example, as shown in FIG. 11 and FIG. 12.

3.1c

In some embodiments, the capture time and display time are not changed, so the motion pictures are captured with a constant time interval and presented with the same time interval. Instead, the captured motion pictures are manipulated in post processing/production steps. In general, a frame is presented at time t using the frame captured at time $t_2(t)$. For example when the input is 120 fps content, it is possible to design the time function as $$\begin{cases} t_2(t) = t, & \text{if } \mod(t, 5) \neq 0 \\ t_2(t) = t - 1, & \text{otherwise} \end{cases}$$

Figure 13:
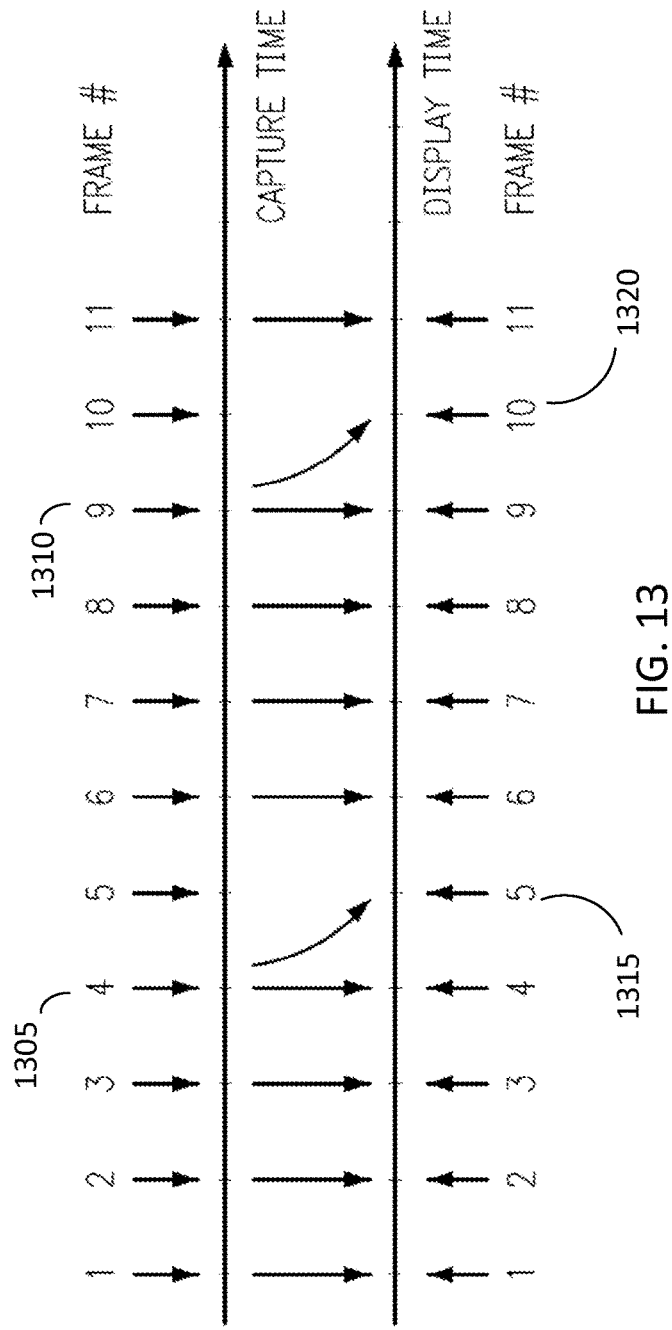

Essentially, this time function will repeat the $4^{th}$ frame in every five frame period and discard the original $5^{th}$ frame. This particular embodiment is shown in FIG. 13, where the $4^{th}$ (1305) and $9^{th}$ (1310) frames are used also for the $5^{th}$ (1315) and $10^{th}$ (1320) frames.

Other time functions $t_2(t)$ can be designed as well. Not only can the number 5 be changed, but it does not need to be an integer. When $t_2(t)$ is not an integer, the frame is not captured at $t_2(t)$. In this other embodiment, it is possible to use view interpolation technology to generate a frame which simulates the frame in between two frames that are captured at time floor(t) and floor(t)+1. An example is shown in FIG. 14.

Figure 14:
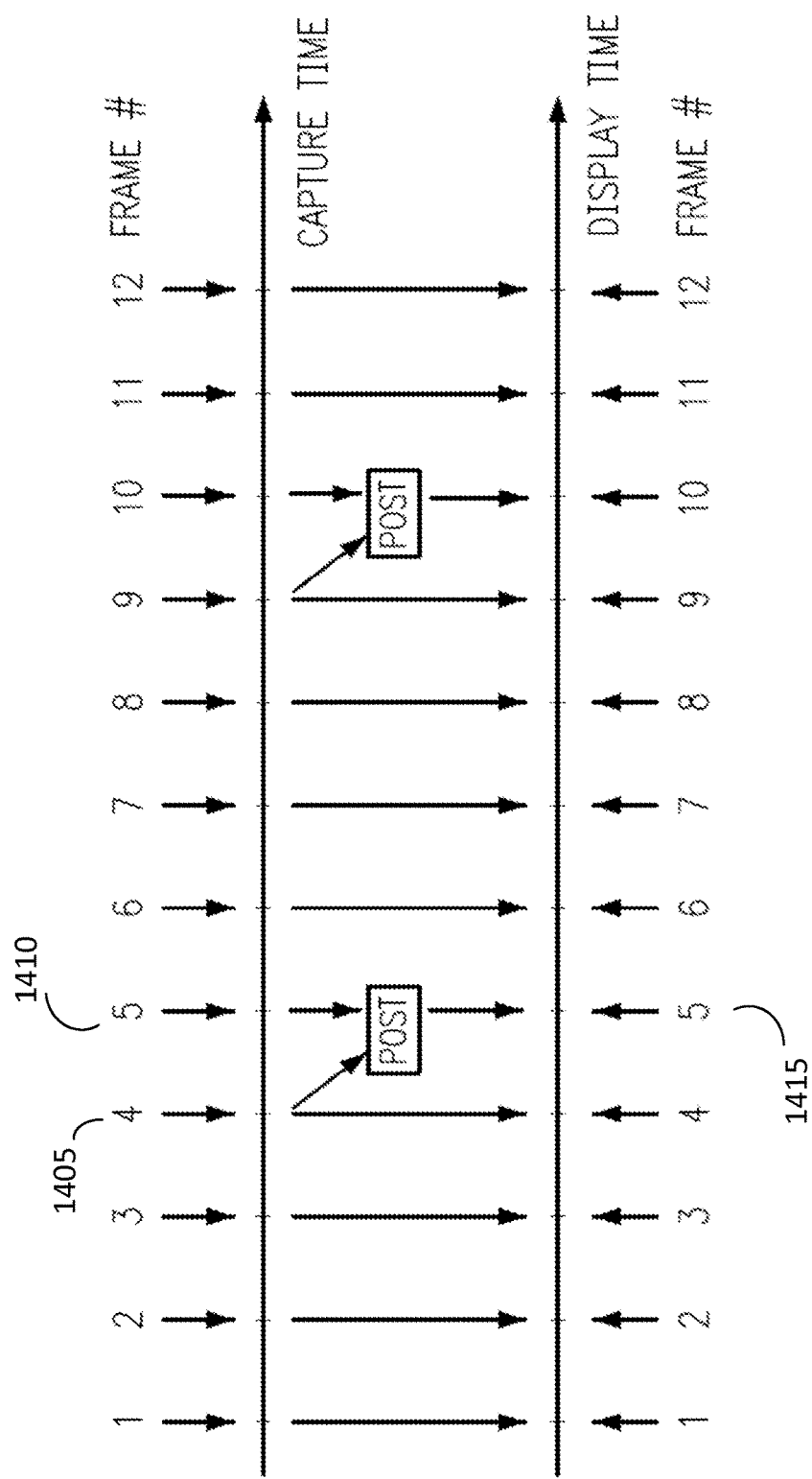

In FIG. 14, the $4^{th}$ (1405) and $5^{th}$ (1410) captured frames are used to generate the $5^{th}$ (1415) displayed frame. A possible process of view interpolation would be to first find out the motion vectors between frames [t] and [t]+1, and for each pixel in the interpolated frame, use the motion vectors to derive the corresponding pixels in the two neighboring frames and obtain the pixel values based on those corresponding pixels and their neighboring pixels.

3.2 Adding 24 Hz Content to High Frame Rate

Twenty-four Hertz content would be an essential reason for why we perceive judder, and the content of this particular frequency have contributed to the formation of judder perception in history. In order to inject judder, it can be possible to introduce 24 Hz content into high frame rate content. However, the whole content should not be converted wholly into 24 fps, otherwise the benefit of the high frame rate would be lost.

3.2a Adding 24 Hz Noise/Film Grain

Figure 15:
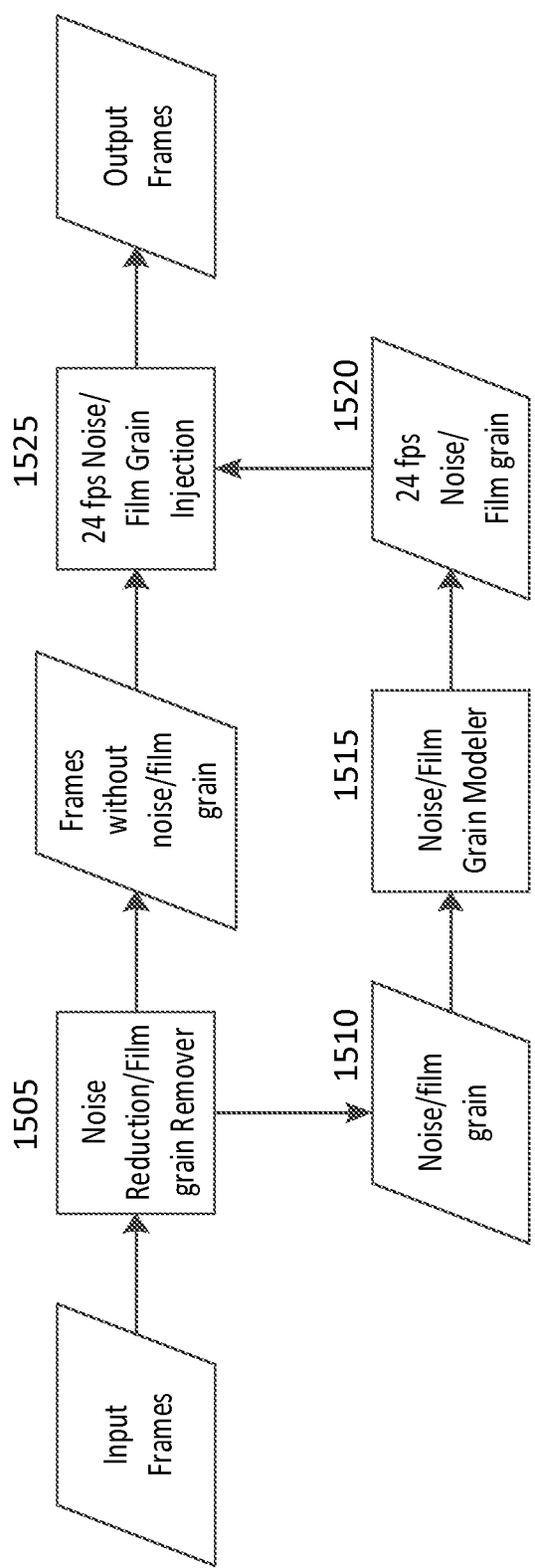
FIG. 15 illustrates an embodiment of a judder control algorithm according to an embodiment of the disclosure.

While the content of interest itself is updated at a high frame rate, it is possible to add low frame rate noise or film grains (simulations or actually captured) on top of the content. It is possible to first use a noise reduction method (1505) to reduce the noise or film grain in the original high frame rate content, and the removed noise or film grain (1510) will be processed (1515) to generate a 24 Hz noise or film grain (1520) with similar spatial characteristics. This 24 Hz regenerated noise or film grain (1520) can then be added back (1525) into the high frame rate content. This process can be seen in FIG. 15.

One way to generate the 24 fps noise and film grain could be to repeatedly use the noise/film grain of one frame and apply it in all its neighboring five frames for the 120 fps content. Thus every fifth frames would have a same noise/film grain, although the content itself is changing at 120 fps.

3.2b Changing the 24 Hz Content of the Original High Frame Rate

It is possible to change the 24 Hz content of the original high frame rate content by repeatedly changing the frames that would be shown at 24 Hz. For example, for 120 fps content, it is possible separate the frames into five different groups according to the remainder of its frame index divided by five. Thus, each group is actually a 24 Hz content. It is possible to alter the frames within one or more of the groups, thus a 24 Hz signal would be added into the original content. There are many ways to alter the content, for example, by applying spatial filters on each frame of the group, with or without a spatially shifted center. Specifically, a smoothing filter (Gaussian, Sigma, bilateral, etc.) or sharpening filter (like unsharp mask) can be used to change the image in this group so it has different characteristics compared to images in other groups. At the same time, the frames in this group can be jittered around or undergo a non-uniform transformation based on some characteristics of the content itself, for example, the motion vectors. In addition, each group of the high frame rate content can also be temporally filtered in order to add 24 Hz content.

4. Broader Judder Visibility Control

The approaches detailed above can be broadened in different ways.

A first example of a broadened approach to judder visibility control considers an input frame rate $R_{in}$ (the frame rate of input content) with corresponding time period $T_{in}$ between two consecutive frames, where $T_{in}=1/R_{in}$, and the output frame rate is $R_{out}$ (i.e., the display frame rate) with corresponding time period $T_{out}$. In the examples above, methods could be applied, for example, for the case where $R_{out}=2*R_{in}$. The broadened approach as follows herein can be for cases where the output frame rate is not double the input frame rate.

For example, a first generalization might be for the case $R_{out}=2*n*R_{in}$, where n=1, 2, ..., is a natural number. In this case, the Base Frame Rate (BFR) can be kept as the input frame rate, and the methods described above in the present disclosure can be used to double the frame rate by interpolating a frame between every two consecutive input frames based on a locally changing displacement map dt(x,y,t). The output will then have double the frame rate, that is $2*R_{in}$, which can be displayed at the display rate $R_{out}$, with each output frame being displayed n times.

Figure 18:
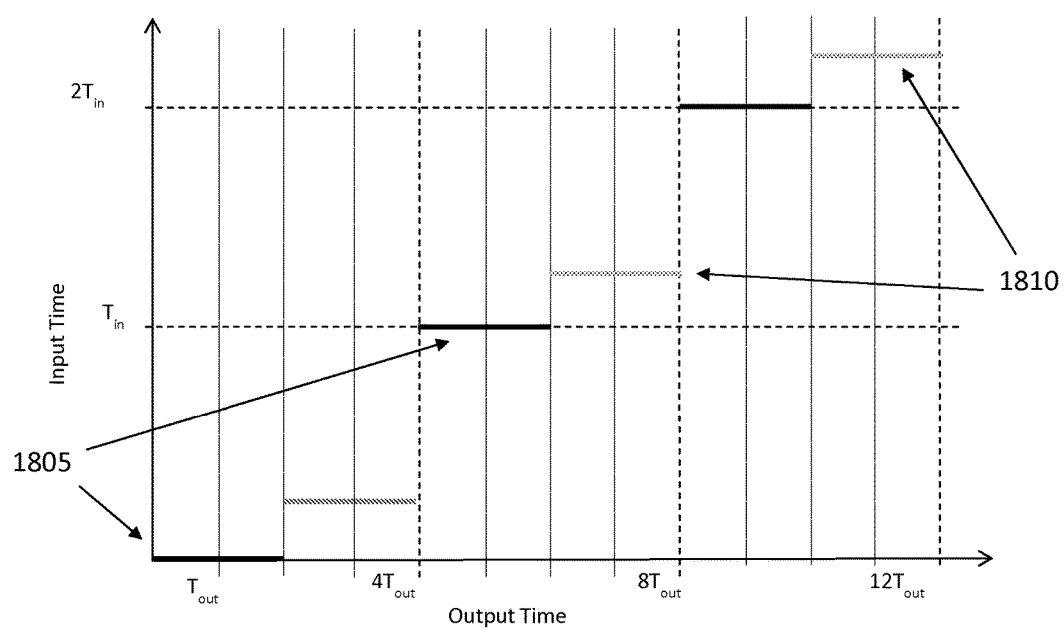
FIGS. 18-19 illustrate some examples of mapping related to judder control.

FIG. 18 shows an example of an embodiment, as discussed above, for the specific case where n=2, and $R_{out}=4*R_{in}$, with $dt(x,y,t)=0.25*T_{in}=T_{out}$. The black lines (1805) show the input frames, the gray lines (1810) are interpolated frames. Each frame (1805, 1810) is shown for a duration of $2T_{out}$.

For the embodiments when $R_{out}$ is not an even number of $R_{in}$, $T_{in}$ is not an even number of $T_{out}$, and the above approach, which keeps the original input frames and interpolates one in between each pair of consecutive frames, needs to be modified. For example, the interpolated frame could be shown at a different temporal location than the one used above, that is half way between original frames. For example, when $T_{in}=5T_{out}$, the original frame could be shown for a duration equal to $3T_{out}$, and the interpolated frame for a duration equal to $2T_{out}$, as visible in FIG. 19.

Figure 19:
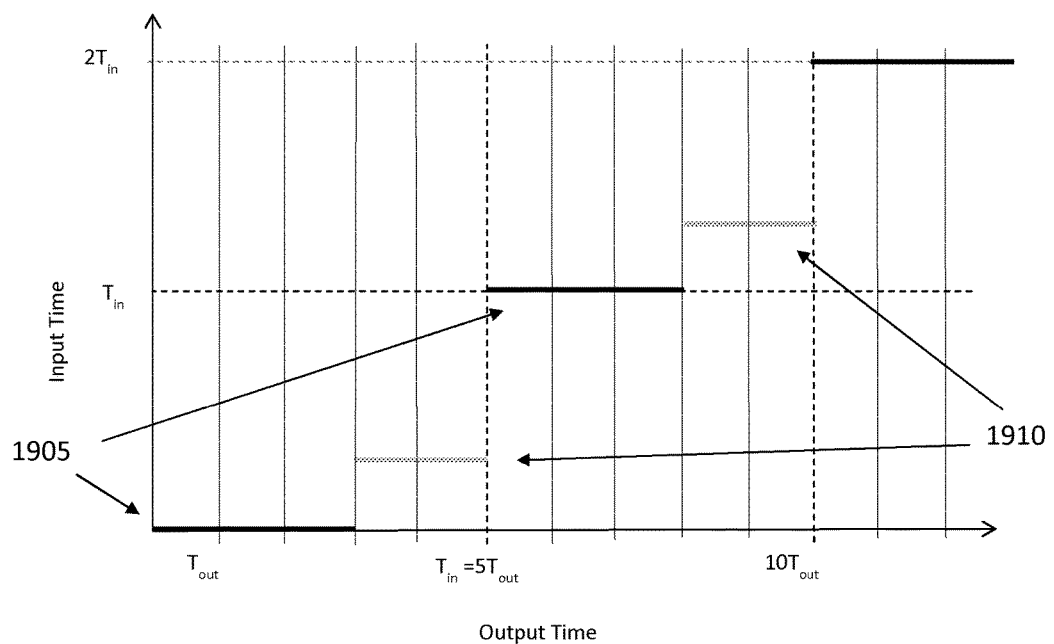

In FIG. 19, the black lines (1905) show the input frames, shown for a duration of $3T_{out}$, while the gray lines (1910) are interpolated frames, shown for a duration of $2T_{out}$.

However, this solution might introduce an artifact signal similar to the well-known in the art 3:2 pull down and that may not be desirable.

In order to avoid 3:2 pull down type artifacts, the Base Frame Rate can be changed to a frame rate close to $R_{in}$. In other words, a natural number k can be found, and the BFR can be made equal to $R_{out}/(2*k)$ so that the BFR is close to $R_{in}$ and is still a juddering frame rate.

Figure 20:
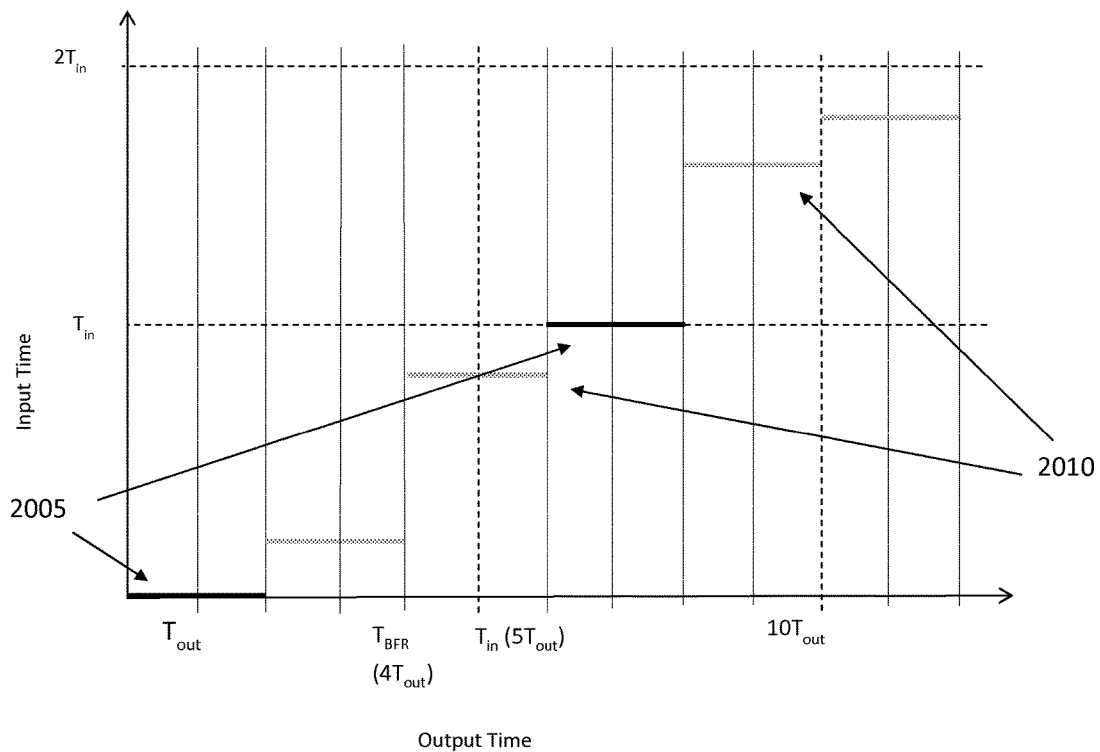
FIG. 20 illustrates an exemplary relationship between output time and input time with a 120 fps input.

For example, if $R_{out}=120$ fps, then k could be chosen to be, for example, k=2 or k=3, and in this way the BFR can be equal to 120/(2*2)=30 fps or BFR=120/(2*3)=20 fps. For simplicity and without loss of generality, the following example is made with k=2 and BFR=30 fps. If the input frame rate $R_{in}=30$ fps, the double frame rate methods described above can be applied, and an output signal can be obtained with double the frame rate, at 60 fps. The output can then be shown on a 120 fps display by repeating every frame 2 times. If the input frame rate $R_{in}$ is 24 fps instead of 30 fps, temporal interpolation can be used to obtain all needed frames. Assuming for example that $dt=0.25*T_{BFR}=T_{out}$, the relationship between output time and input time can be shown in FIG. 20, where the black lines (2005) show the input frames, and the gray lines (2010) are interpolated frames.

In addition, since the above method changed the BFR, the temporal displacement dt needs to be changed accordingly in order to keep the same judder perception.

A second example of a broadened approach to judder visibility control considers the line segment motion model as described in FIG. 2. It is known that the retina image (220) will have judder effects and the displacement x (245) in (220) determines the magnitude of perceived judder. It is possible to arrange a line segment to move in a way such that its retina image under SPEM will have the same shape of (220) but with controllable displacement x.

Figure 21:
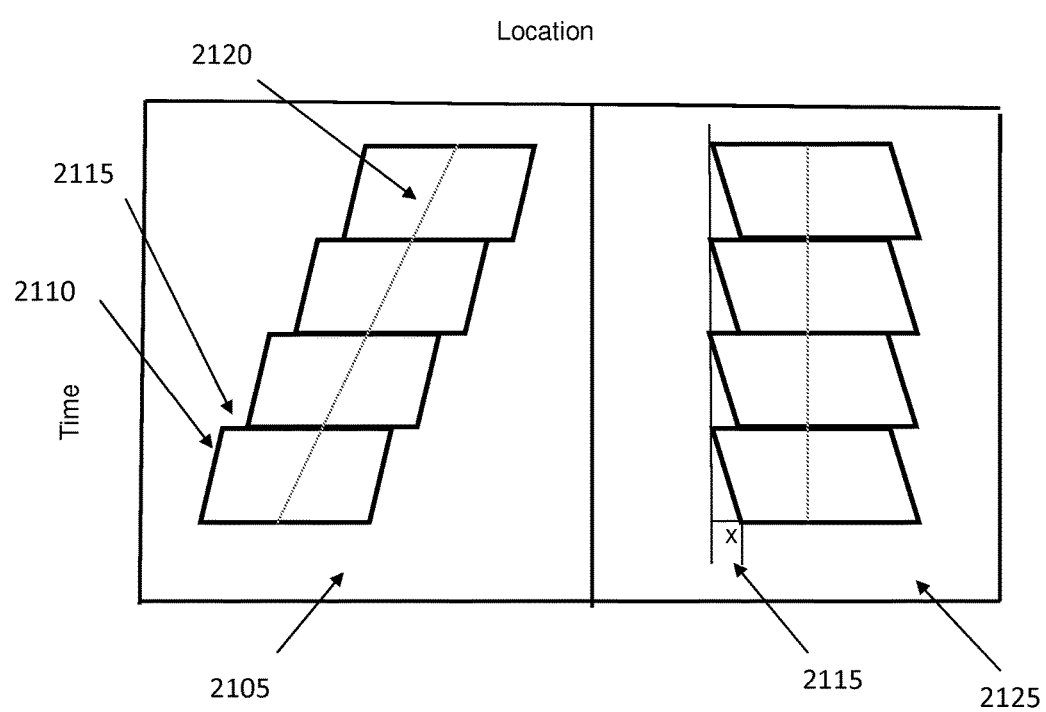
FIG. 21 illustrates some additional concepts related to judder control.

As shown in FIG. 21, (2105), the line segment (2110) moves to the right at a slower speed for a time T=1/BFR, then jumps to the right with distance x (2115). In fact, the slope (2110) of one frame moves to the right at a speed T=1/BFR. Since the BFR is usually high enough, the eye tracking the line segment still follows a straight line, overall, as shown by (2120). The projected trajectory on the retina is shown in (2125), which is similar to the shape as (220) of FIG. 2, but with a different x.

Assuming an infinite frame rate display and the possibility to temporally interpolate the input image sequence to an infinite frame rate, an image sequence can be obtained, with the same space time trajectory as in (205) of FIG. 2. For this infinite frame rate example, the mapping between real time and the display time can be represented as the gray line (2210) shown in (2205) in FIG. 22.

Subsequently, the infinite frame rate input can be sampled at the base frame rate (BFR) with corresponding time period T, and displayed on a hold-type display of BFR. The mapping between real time and display time would be shown as the black line segments (2215) in FIG. 22. In the above example, the effect of shutter angle was not taken into account, for simplicity.

Figure 22:
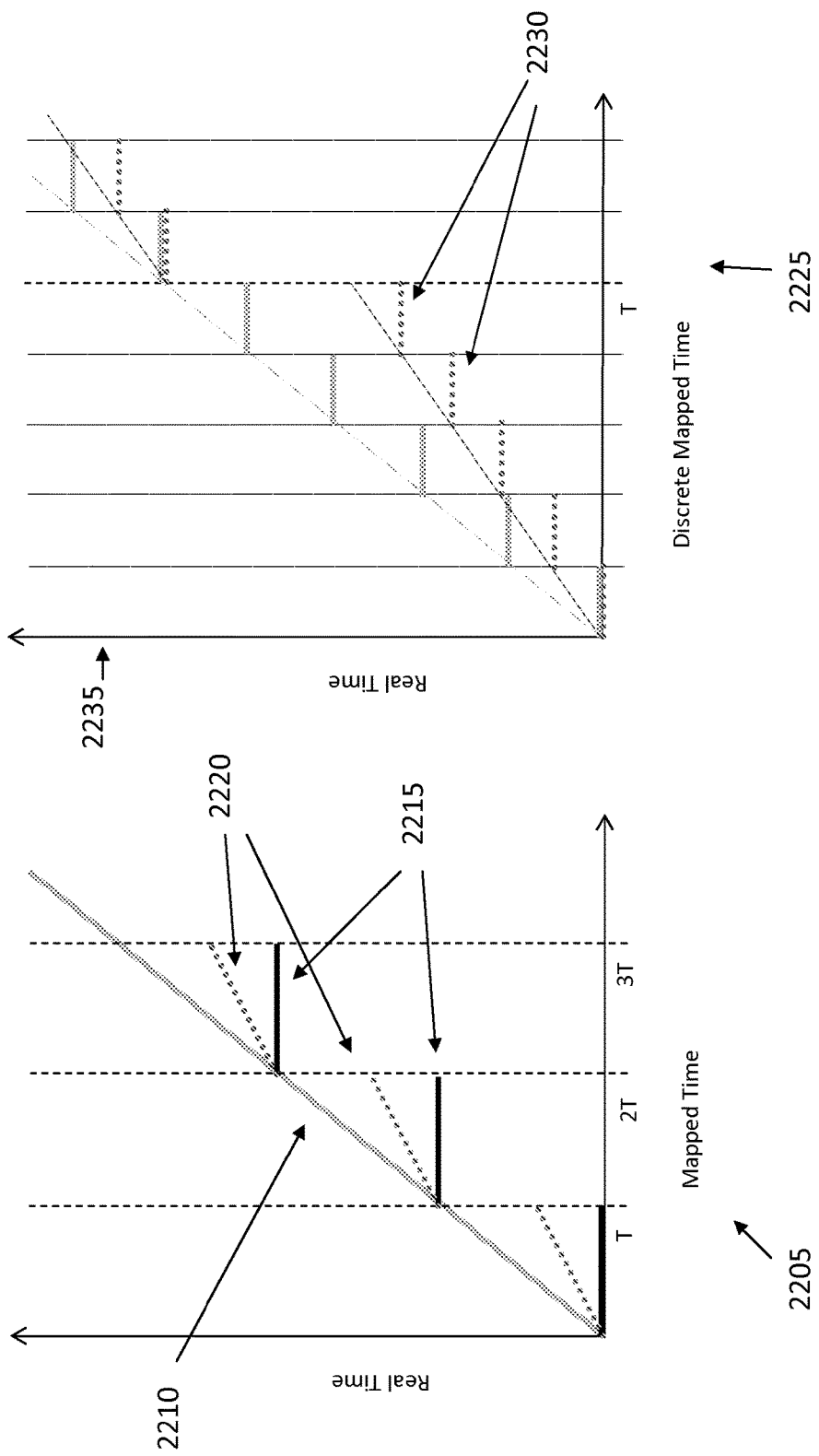
FIG. 22 illustrates the mapping between real time and display time for an infinite frame rate example.

Subsequently, a non-smooth motion can be introduced, similarly to FIG. 21. That is, the infinite frame rate input can be played back at a slower speed in each time period T, and at the end of each T, there is a jump forward to catch up to the real playback time. The mapping curve will then be changed to the dotted line segments (2220), as shown in FIG. 22. In this case, the object, which in reality is moving smoothly, is displayed as moving at a slower speed within a time period T, and then is displayed as jumping to a new location at the start of the next time period. The jumping introduces a signal of BFR which would be perceived as judder, while the jumping amount, determined by the slope of the dotted line segments (2220), will affect the magnitude of perceived judderness. In other words, the perceptual judderness can be controlled between the two extremes, i.e., between no judder at all and the normal amount of judder at the base frame rate.

Hence, the slope of dotted line segments (2220) can be used as a Judder Control Rate (JCR) to control the judderness of the output. When the slope equals 1, there is no jump so there is no judder, while the largest amount of jump happens when the slope equals 0. This JCR has a similar effect as the dt in the example described above, where the frame rate is doubled, however, in the present example an infinite frame rate is considered.

In several embodiments, the time period T corresponding to the base frame rate (BFR) is a multiple of the period $T_d$ corresponding to the display frame rate. For example, the display frame rate can be 120 fps and the BFR can be 24 fps. FIG. 22 illustrates a mapping (2225) for an embodiment where the display frame rate is five times the value of the BFR. A perfect sampling of the line (2210) will result in a mapping similar to the line (230) in (210) in FIG. 2.

Figure 23:
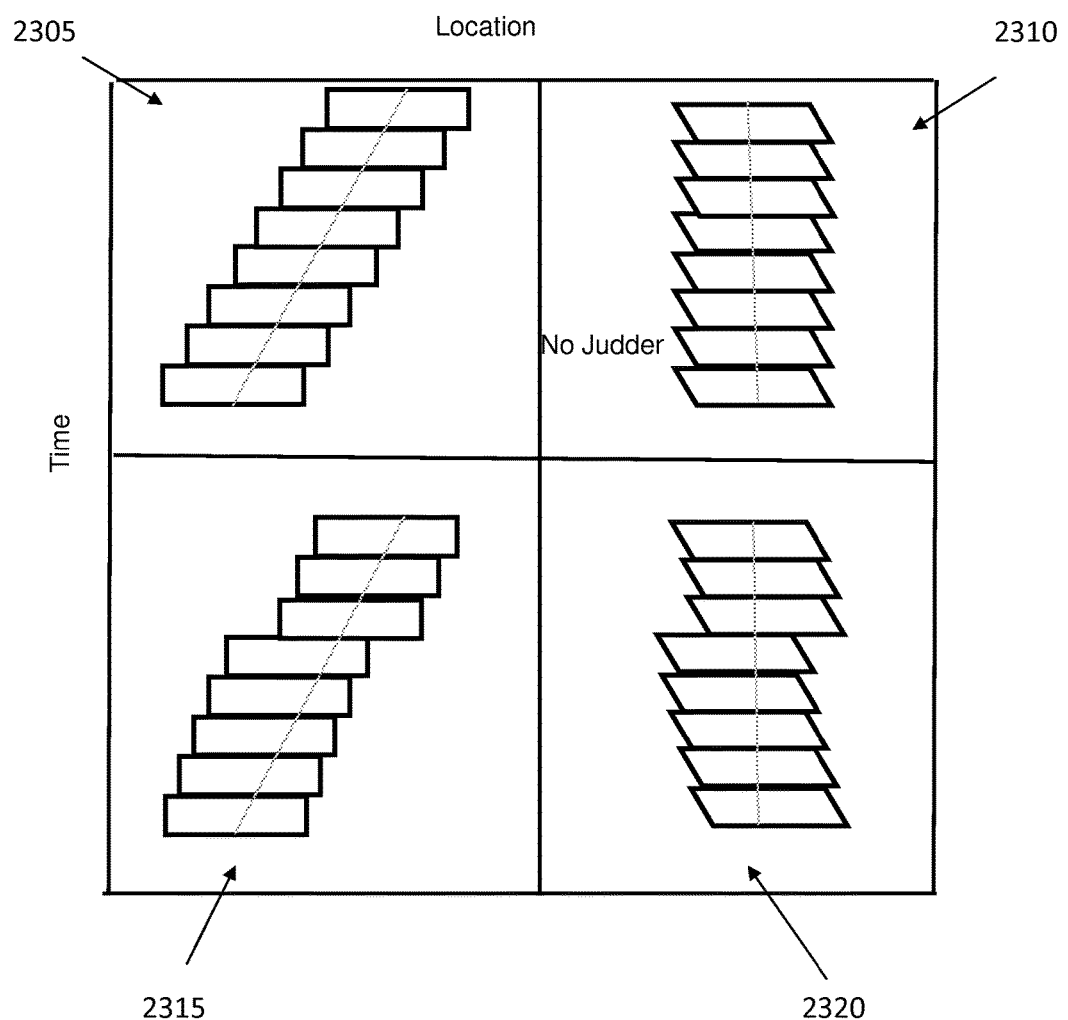
FIG. 23 illustrates time space trajectories lines, with and without smooth pursuit object eye tracking.

Therefore, the object will still move smoothly without any judder perception, assuming the display frame rate is high enough. If the same line segment motion model is used, the time space trajectories can be illustrated as in FIG. 23, for the real space case (2305) and the retina projection case (2310). If the input with judder perception is sampled similarly to the line segments (2215) in FIG. 22, the mapping obtained can be represented by the dotted line segments (2230) as shown in FIG. 22. In other words, the input image sequences can be interpolated to those discrete time stamps where the dotted lines (2230) are projected onto the vertical real time axis (2235). The corresponding space time trajectory of the line segment motion model is shown in FIG. 23, (2315, 2320).

If the time period T of the BFR is multiple times the value of the time period $T_d$ corresponding to the display frame rate, and the Judder Control Rate (JCR) is denoted as r, which is the slope of the lines (2220) in FIG. 22, the sampling time f(t) for each display time t can be computed as:

$$f(t)=n \cdot T+r \cdot \lfloor (t-n \cdot T)/T_d \rfloor \cdot T_d,$$

where $n=\lfloor t/T \rfloor$. Since we know T is multiple times of $T_d$, let $T=kT_d$, we have $$f(t)=(1-r) \cdot n \cdot k \cdot T_d+r \cdot m \cdot T_d,$$

where $n=\lfloor t/T \rfloor$ and $m=\lfloor t/T_d \rfloor$.

In embodiments when T is not multiple times the value of $T_d$, a value can be chosen so that $T' \approx T$ where T' is a multiple of $T_d$, and subsequently the equation above can be used to calculate f(t). It may be possible that the JCR might need to be adjusted as the BFR is changing, in order to preserve the same amount of judder visibility.

Figure 24:
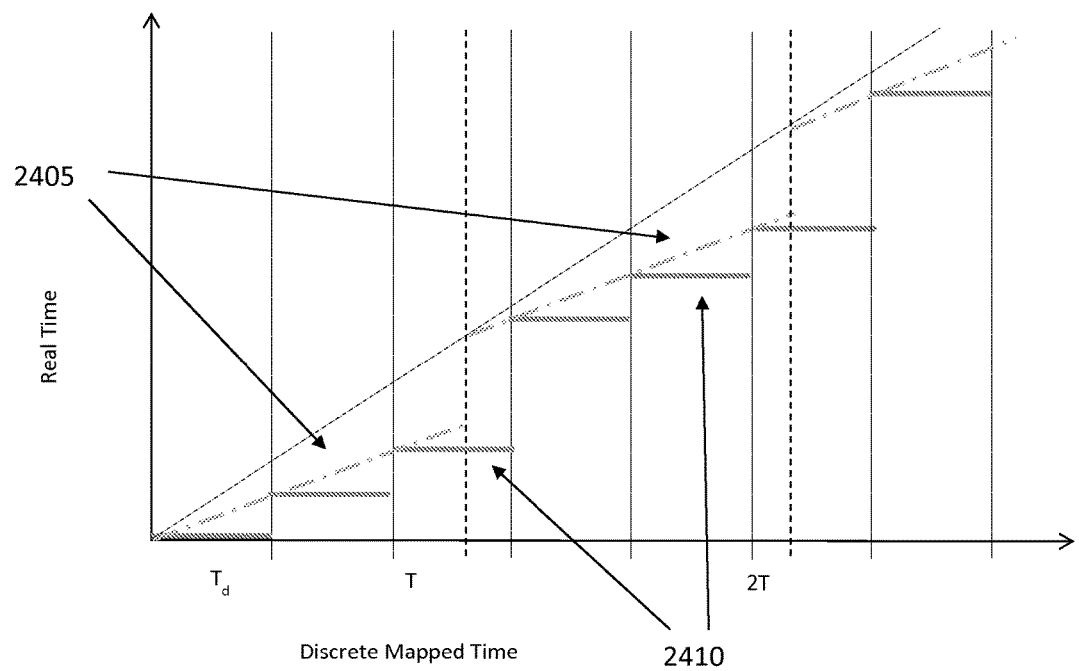
FIG. 24 illustrates mapped time and real time for an embodiment of judder control of the present disclosure.

Another possible method, that does not require changing BFR, can be described as follows. At first an infinite frame rate display is considered, therefore the sampling time will follow the sloped lines (2220) as in FIG. 22. In FIG. 24 the sloped lines (2405) are shown for each base time period T. The sloped lines (2405) represent the infinite frame rate case, and it is then possible to sample the infinite frame rate sequence with sampling rate $1/T_d$, as shown in the horizontal lines (2410). The formula for the time mapping of the sloped lines (2405) is $$f(t)=n \cdot T + r \cdot (t - n \cdot T)$$

where $n = \lfloor t/T \rfloor$. The formula for the sampled horizontal lines (2410) is then $f(t) = f'(T_d \cdot m)$, where $m = \lfloor t/T_d \rfloor$, and by combining the two equations the following formula can be obtained $$f(t)=(1-r) \cdot n \cdot T + r \cdot m \cdot T_d,$$

where $n = \lfloor t/T \rfloor$ and $m = \lfloor t/T_d \rfloor$.

It can be seen that if T is multiple times the value of $T_d$, i.e, $T = kT_d$, the same formula will be obtained as for the case described above in paragraph [0105]. Therefore, this equation is a further generalization.

Similarly to the embodiments described above, this JCR, or r, can be a spatially and temporally variant function r(x,y,t), i.e., the judder control rate can be different for different space time locations so that the judder visibility control can be applied differently to different regions at different times.

To summarize, the judder visibility control methods described in the present disclosure have been broadened in order to be able to control the judder perception of any input frame rate $R_{in}$ to any output frame rate $R_{out}$, given the Judder Control Rate (JCR) and Base Frame Rate (BFR). The overall flow chart is shown as in FIG. 25.

Figure 25:
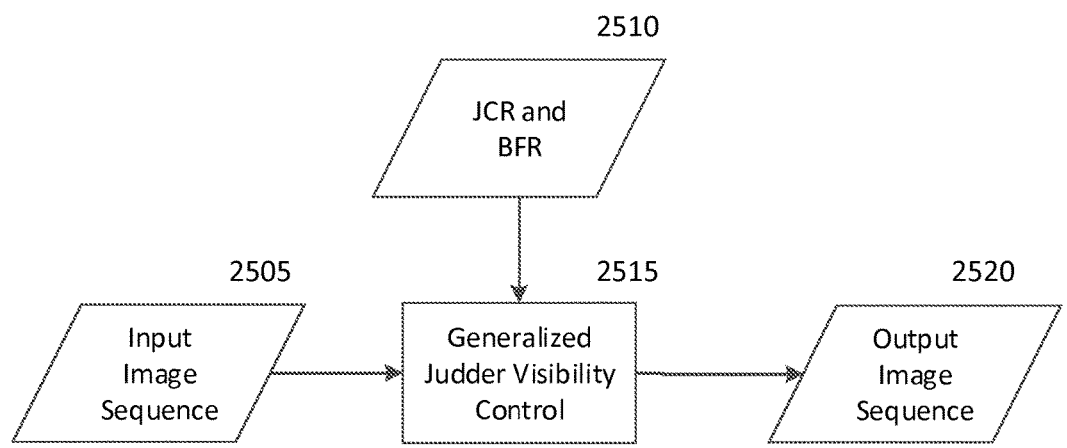
FIG. 25 illustrates an example of a broadened judder visibility control flowchart according to an embodiment of this disclosure.

As visible in FIG. 25, the broadened judder visibility approach (2515) described above can be applied to the input image sequence (2505), using the Judder Control Rate process (2510) and the base frame rate (2010), thus obtaining an output image sequence (2520).

5. Film Look Experience for High Frame Rate and Multiple Frame Rates

Figure 26:
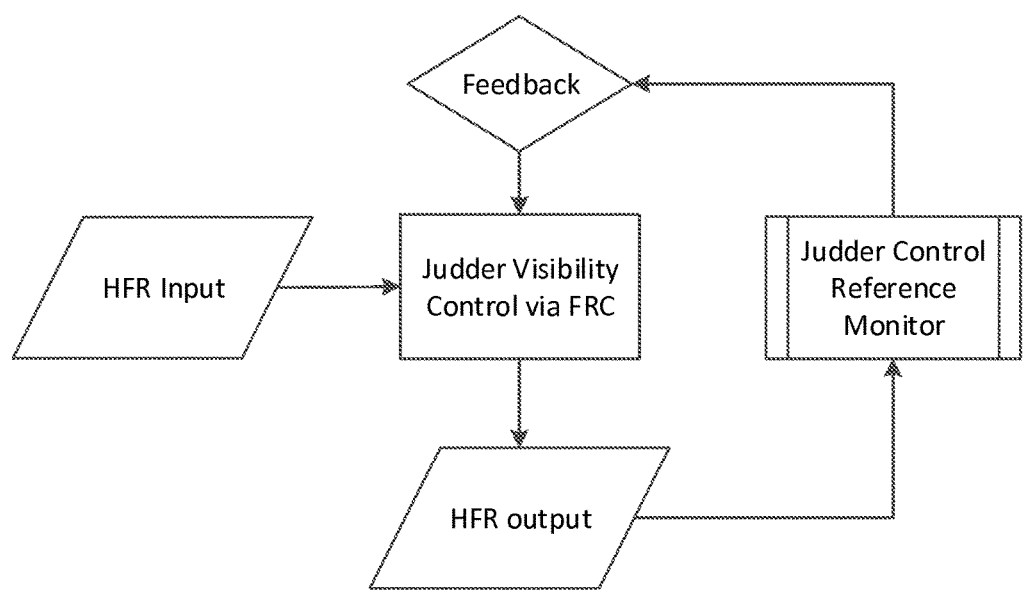
FIG. 26 illustrates an example of a broadened judder visibility control flowchart for high frame rate images according to an embodiment of this disclosure. This step is generally controlled by a human operator at the image production stage (i.e. post-production)

The broadened judder visibility control approaches described above can be applied in high frame rate (HFR) image sequences to obtain a film-look experience. The high frame rate image sequences usually have sharper images and less motion blur, and the stereoscopic high frame rate will have better 3D effects compared to traditional 24 fps image sequences. However, the smooth motion in high frame rate is sometimes criticized as 'video look' as there is no juddering perception. The methods described above can be used to introduce judderness into the high frame rate image sequences. The introduced judderness can help to increase the film look experience of the content. FIG. 26 shows a diagram for adding film look experience to HFR input content.

In this case, both input and output image sequences will have the same frame rate, i.e., $R_{out} = R_{in}$. For example, both input and output can be 48 fps, 60 fps, 120 fps, and etc. Since the input sequence is sampling the scene at a high frame rate, there is no judder perception in the input sequence when it is displayed at the same frame rate $R_{in}$. In order to introduce judder perception, a first step is to choose a juddering base frame rate BFR, and select a proper Judder Control Rate r, so that the input image sequence can be resampled with the process as described referring to FIG. 24, with T=1/BFR, and $T_d = 1/R_{in}$. As described above, the Judder Control Rate JCR=r can be determined so that a proper amount of judderness, i.e. film look, can be added into the output image sequences when played back at $R_{out}$. In addition, this r can be a spatially and temporally variant function of r(x,y,t).

Therefore, the film look experience (judder) can be controlled on a pixel by pixel basis at the post-production end. Different pixels may have different JCR at different time. In this case, usually the JCR function r(x,y,t) will be locally smooth within a shot.

In a simplified embodiment, the film look experience can be controlled on a frame by frame basis at the post-production end. Different frames may have different JCR. In this case, the JCR function r(t) will be locally smooth within a shot.

In some embodiments, the film look experience (judder) can also be controlled on a shot by shot basis at the post-production end. Different shot may have different JCR, thus different amount of judderness will be added to different shot, when there is a need.

At the post-production end, one embodiment comprises using professional tools to identify the local region that needs judder perception. Subsequently the JCR needed to add the proper amount of judder can be determined. In a next step, the JCR can be smoothed spatially and temporally within a shot boundary.

There exist different methods for mixed frame rate content, with multiple frame rates in a sequence or even within a frame, as noted in Refs. [2][3]. The fast motion frames/objects can benefit from a higher frame rate while the slower motion frames/objects can be kept at a lower frame rate. The broadened judder visibility control approaches described above can be applied to these contents with multiple frame rates as well.

In low frame rate frames/regions, there might be excessive juddering that needs to be reduced, while at the high frame rate frames/regions, the juddering perception needs to be added back. The methods described above and following can be combined together to control the visibility of the judder in multi-frame rate content.

In the present disclosure, therefore, methods are described which comprise providing, by a computer, at least two images; calculating, by a computer, a judder map, wherein the judder map comprises judder information for at least one pixel of the at least two images; and processing the at least one pixel based on the judder map.

Processing of the at least one pixel may comprise processing of a region of an image, formed by several pixels. Processing may comprise applying different video processing techniques, and different techniques, or the same technique with different parameters may be applied to different pixels, based on the judder information on that pixel contained in the judder map.

Figure 16:
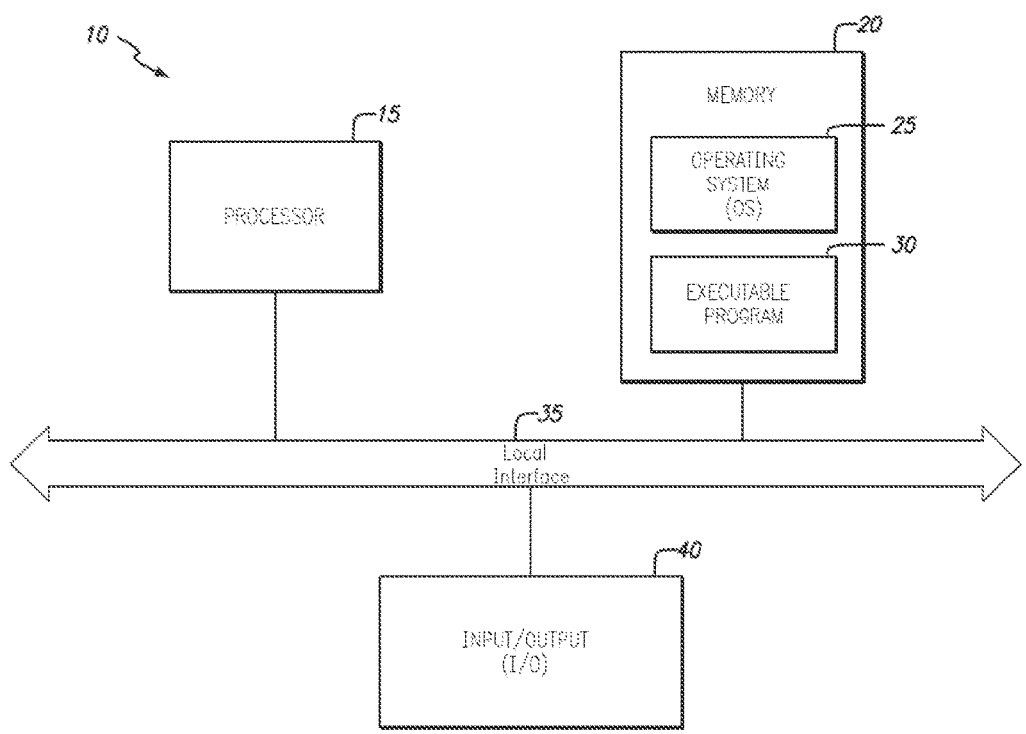
FIG. 16 illustrates an embodiment of a hardware implementation for the methods of the present disclosure.

FIG. 16 is an exemplary embodiment of a target hardware (10) (e.g., a computer system) for implementing the embodiments of FIGS. 1-15. This target hardware comprises a processor (15), a memory bank (20), a local interface bus (35) and one or more Input/Output devices (40). The processor may execute one or more instructions related to the implementation of FIGS. 1-15, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 16. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-15, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] U.S. provisional patent application, Ser. No 61/945,706, filed on Feb. 27, 2014.
[2] PCT Ser. No. PCT/US2012/039338, filed on May 24, 2012.
[3] U.S. Pat. No. 8,363,117.
[4] Watson, Andrew B., Albert J. Ahumada Jr, and Joyce E. Farrell. "Window of visibility: a psychophysical theory of fidelity in time-sampled visual motion displays." JOSA A 3.3 (1986): 300-307.
[5] Tyler, Christopher W., and Russell D. Hamer. "Analysis of visual modulation sensitivity. IV. Validity of the Ferry-Porter law." JOSA A 7.4 (1990): 743-758.
[6] U.S. Provisional patent Application Ser. No. 61/907,996, filed on Nov. 22, 2013.

What is claimed is:

1. A method to control judder visibility, the method comprising:
    providing, by a computer, at least two input frames comprising a first frame and a second frame;
    estimating, by a computer, an interpolation map based on the at least two input frames, thereby obtaining an estimated interpolation map, wherein the estimated interpolation map specifies a temporal interpolation position for at least one pixel of the at least two input frames;
    interpolating, by a computer, at least one additional frame, based on the at least two input frames and the estimated interpolation map, thereby obtaining at least one interpolated frame, wherein at least one pixel of the at least one interpolated frame corresponds to at least one pixel at the time specified by the interpolation map of that at least one pixel; and
    identifying, by a computer, for the at least one pixel of the at least two input frames, an amount of judder, wherein the estimating, by a computer, an interpolation map is based also on the amount of judder, and wherein identifying an amount of judder comprises:
        generating a luminance change map and a contrast change map using the first frame and the second frame by calculating temporal differences between the first frame and the second frame for luminance and contrast; and
        generating a judder map using the luminance change map and the contrast change map, wherein the judder map comprises judder information for the first frame.

2. The method of claim 1, further comprising providing, by a computer, user input on a desired amount of judder for at least one pixel of the at least two input frames, and wherein the estimating, by a computer, an interpolation map is based also on the user input.

3. The method of claim 1, further comprising applying, by a computer, motion blur to the at least one interpolated frame.

4. The method of claim 1, wherein at least one input frame is inserted in an output stream without modification.

5. The method of claim 1, further comprising:
identifying, by a computer, at least one region of the at least two input frames, the at least one region having an amount of judder higher than a desired amount of judder, wherein the interpolating is applied only to the at least one region.

6. The method of claim 5, wherein the at least one region is updated, by a computer, to a higher frame rate than a frame rate of the at least two input frame.

7. The method of claim 1, wherein the estimating, by a computer, an interpolation map comprises estimating a forward motion vector, a backward motion vector, a temporal motion consistency, a spatial motion consistency, a forward motion consistency and a backward motion consistency.

8. The method of claim 1, further comprising:
determining a motion speed of at least one pixel, wherein the relationship between the motion speed of a pixel and its interpolation position is a soft switching function between two speed thresholds, and wherein the estimating, by a computer, an interpolation map is based on the determined motion speed of the at least one pixel.

9. The method of claim 1, wherein the interpolating is based on frame rate conversion or based on motion compensation.

10. The method of claim 1, where a normalized measure of judder is pre-computed and delivered with an original content, such that a target device can decide how to adjust judder at a later time.

11. The method of claim 1, wherein:
an output frame rate is an integer number of an input frame rate, and
the at least one additional frame is interpolated between the at least two input frames.

12. The method of claim 11, further comprising identifying, by a computer, for the at least one pixel of the at least two input frames, an amount of judder, and wherein the estimating, by a computer, an interpolation map is based also on the amount of judder.

13. The method of claim 11, further comprising providing, by a computer, user input on a desired amount of judder for at least one pixel of the at least two input frames, and wherein the estimating, by a computer, an interpolation map is based also on the user input.

14. The method of claim 1, further comprising:
calculating a base frame rate, the base frame rate being an even number of an output frame rate and substantially close in value to an input frame rate, thereby displaying judder similarly to the input frame rate, wherein an output frame rate is a non integer number of the input frame rate; and
interpolating, by a computer, at least two additional frames, based on the at least two input frames, the base frame rate, the input frame rate, and output frame rare and the estimated interpolation map, thereby obtaining at least two interpolated frames, wherein at least one pixel of at least one of the at least two interpolated frames corresponds to at least one pixel at the time specified by the interpolation map of that at least one pixel, wherein the at least two additional frames are interpolated between the at least two input frames.

15. The method of claim 14, further comprising identifying, by a computer, for the at least one pixel of the at least two input frames, an amount of judder, and wherein the estimating, by a computer, an interpolation map is based also on the amount of judder.

* * * * *